US 012141591B2

(12) United States Patent
Flynn

(10) Patent No.: US 12,141,591 B2
(45) Date of Patent: Nov. 12, 2024

(54) DYNAMIC POLICY ADJUSTMENT BASED ON RESOURCE CONSUMPTION

(71) Applicant: Microsoft Technology Licensing, LLC, Redmond, WA (US)

(72) Inventor: Brendan Flynn, Snoqualmie, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 491 days.

(21) Appl. No.: 17/492,311

(22) Filed: Oct. 1, 2021

(65) Prior Publication Data
US 2023/0106369 A1 Apr. 6, 2023

(51) Int. Cl.
  *G06F 9/48* (2006.01)
  *G06F 9/445* (2018.01)
  *G06F 9/50* (2006.01)
  *G06N 20/00* (2019.01)

(52) U.S. Cl.
  CPC .......... *G06F 9/44526* (2013.01); *G06F 9/445* (2013.01); *G06F 9/4881* (2013.01); *G06F 9/50* (2013.01); *G06N 20/00* (2019.01); *G06F 2209/508* (2013.01)

(58) Field of Classification Search
  CPC .... G06F 9/44526; G06F 9/445; G06F 9/4881; G06F 9/50; G06F 2209/508; G06F 11/302; G06F 2201/81; G06F 2201/865; G06F 11/3409; G06N 20/00
  See application file for complete search history.

(56) References Cited

U.S. PATENT DOCUMENTS

| | | | |
|---|---|---|---|
| 2014/0215242 A1 | 7/2014 | Jung | |
| 2016/0378578 A1 | 12/2016 | Nandakumar | |
| 2017/0318072 A1* | 11/2017 | Borrowman | H04L 67/01 |
| 2018/0302409 A1* | 10/2018 | Hope | G06F 21/6281 |
| 2019/0079780 A1* | 3/2019 | Coven | G06N 5/02 |

OTHER PUBLICATIONS

"International Search Report and Written Opinion Issued in PCT Application No. PCT/US22/038122", Mailed Date: Nov. 28, 2022, 17 Pages.
"Invitation to Pay Additional Fee Issued in PCT Application No. PCT/US22/038122", Mailed Date: Oct. 7, 2022, 11 Pages.

* cited by examiner

*Primary Examiner* — Sisley N Kim

(57) ABSTRACT

A computer storage media having instructions stored thereon which, when executed by a computing device including a processor and memory, cause the computing device to: receive, by a first process running on the computing device, an incoming task; load, by a second process running on the computing device, a plugin corresponding to a type of the incoming task; execute the plugin in the second process to handle the incoming task; monitor a plurality of resource consumption metrics of the plugin by a resource manager associated with the first process; and control the second process based on the resource consumption metrics of the plugin.

20 Claims, 14 Drawing Sheets

MOBILE COMPUTING DEVICE

DYNAMIC POLICY ADJUSTMENT BASED ON RESOURCE CONSUMPTION

BACKGROUND

Many software applications and software services are extendable by first-party developers and third-party developers through plugin application programming interfaces (APIs). For example, web browser plugins or "extensions" add features to a web browser application (such as password management, web page archiving, and web page modification for improved accessibility or to add functionality), and image editing plugins may add features to an image editing application (such as additional filters, metadata editors, and other features).

One example of an extendable software service is an indexing service, which parses metadata and content data associated with various documents (e.g., files on a file system, emails) that are accessible to the indexing service (e.g., on attached storage devices or accessible via a network connection) and stores information about the parsed metadata and content data (e.g., in a database). The stored information then enables document search software (e.g., desktop search software) to quickly respond to a query with a list of search results by performing lookups in the database, rather than searching through the underlying content at the time of the query. Examples of indexing services include the Indexing Service in Microsoft® Windows®, Spotlight® in Apple® MacOS® and iOS®, AppSearch in Google® Android®, and Recoll and Tracker in Linux and other Unix-like systems. In particular, plugins enable indexing services to handle a wide variety of file types, by using a specialized plugin on a per-file-type basis. When a new software application (or "app") is installed on a computer system, a new plugin may also be installed so that the indexing service can index the data stored by the new application so that this data can be included, if relevant, among the search results in response to a search query.

It is with respect to these and other considerations that examples have been made. In addition, although relatively specific problems have been discussed, it should be understood that the examples should not be limited to solving the specific problems identified in the background.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

As discussed above, plugins can be useful features for software applications for a variety of reasons. However, these plugins may not perform as desired due to errors or malicious code incorporated in the plugins. For instance, the plugins sometimes behave in ways that are user-unfriendly or user-hostile, such as by consuming excessive resources (e.g., CPU time, memory, energy, and input/output bandwidth on devices such as mass storage or network), thereby causing the computing device to hang while a user is trying to accomplish other work. Accordingly, to help address these negative impacts on computing performance, examples of the present technology may monitor plugins to detect undesired behaviors. Based on the detected behaviors, the technology may pause, reschedule, deprioritize, or otherwise control the running of such plugins. As a result, computing performance is improved and computing resources are allocated in a manner that produces an overall improvement to the computing system by preventing negative effects from plugins or actively controlling such plugins to reduce or minimize the impact of such misbehaving plugins on (human) users of the computing system.

In an example, the present technology may provide for managing the execution of plugins, where a plugin resource manager (or central resource manager) may implement various techniques separately or in combination. In some examples, the plugin resource manager sends queries to plugins, where the plugin API requires that the plugins respond or acknowledge ("ACK") the queries within a specified ACK timeout period. A failure to respond to the query (or ack the query) indicates that the plugin is misbehaving, and, in some examples, the plugin resource manager disables the plugin after detecting multiple such failures to ACK within the ACK timeout period. In some examples, the plugin resource manager isolates plugins from one another, such as by executing plugins in different operating system-level processes based on the type of plugin and/or by running different plugins in separate operating system-level processes on a one plugin per process basis.

The plugin resource manager may also, or alternatively, monitor resource consumption metrics (e.g., CPU, memory, and input/output operations) used by each plugin during execution. The per-plugin telemetry data or metrics collected may be aggregated across multiple executions of the plugin across multiple computing devices. The telemetry data or metrics are used, in some examples, to determine policies for future executions of the plugins (e.g., scheduling resource-intensive plugins to run at particular times of the day when the user is not active or when the computing device is not performing a resource intensive task such as running a computer game).

The details of one or more aspects are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

The accompanying drawings, which are incorporated in and constitute a part of this disclosure, illustrate various aspects of the present invention. In the drawings.

DETAILED DESCRIPTION

Figure 1:
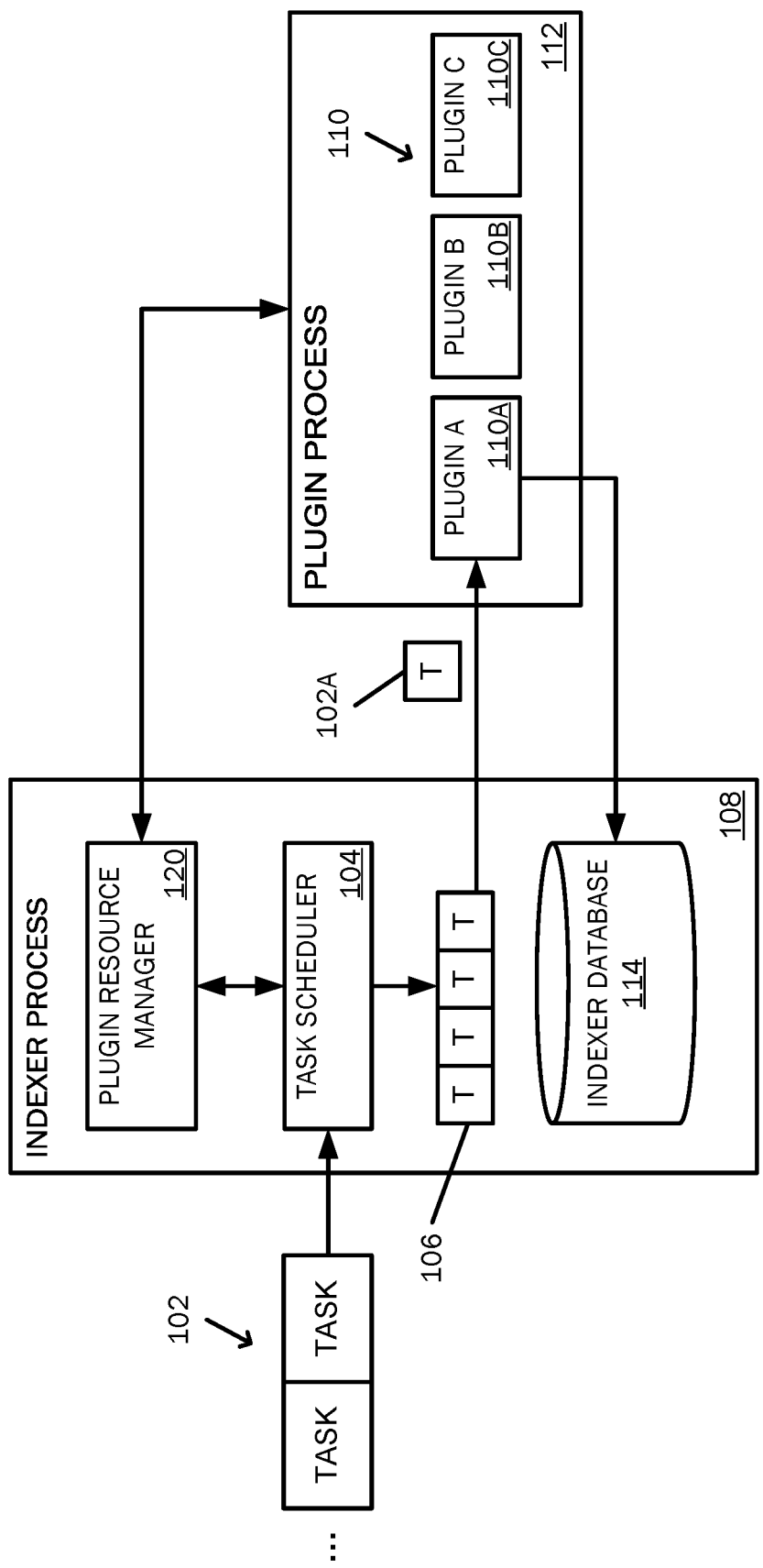
FIG. 1 is an example schematic block diagram of a plugin resource manager running in a host application or service process on a computing device.

The following detailed description refers to the accompanying drawings. Wherever possible, the same reference numbers are used in the drawing and the following description to refer to the same or similar elements. While aspects of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the invention is defined by the appended claims. Examples may take the form of a hardware implementation, or an entirely software implementation, or an implementation combining software and hardware aspects. The following detailed description is, therefore, not to be taken in a limiting sense.

The present technology relates to systems and methods for managing the execution of plugins, extensions, and the like, including dynamically adjusting policies based on observed resource consumption of the managed software. As noted above, many software applications and software services provide extensibility through plugin or extension application programming interfaces. These plugins or extensions provide a modular system for extending the functionality of the software application or service, such as by adding features to a web browser, adding image processing filters to image editing applications, and expanding the types of data objects (e.g., files and other documents) that can be indexed by an indexing service.

Plugins sometimes behave in ways that are user-unfriendly or user-hostile, such as by consuming excessive resources (e.g., CPU time, memory, energy, and input/output bandwidth on devices such as mass storage or network), thereby causing the computing device to hang while a user is trying to accomplish other tasks. The plugin processes themselves may also crash or hang, thereby interrupting the process of executing other plugins or performing higher level tasks (e.g., a plugin hanging or crashing while trying to index one document may prevent the indexer from proceeding with indexing other items). In addition, the plugins may consume system resources for no user benefit (e.g., malware designed to appropriate computer system resources, such as to mine cryptocurrencies for a malicious actor operating the malware).

Accordingly, to help address these negative impacts on computing performance, examples of the present technology may monitor plugins to detect undesired behaviors (such as, but not limited to, the behaviors outlined above). Based on the detected behaviors, the technology may pause, reschedule, deprioritize, or otherwise control the running of such plugins. As a result, computing performance is improved and computing resources are allocated in a manner that produces an overall improvement to the computing system by preventing negative effects from plugins or actively controlling such plugins to reduce or minimize the impact of such misbehaving plugins on (human) users of the computing system.

While some aspects of the present technology are presented in the context of managing plugins managed by an indexing service for indexing documents, the present technology is not limited thereto. In particular, examples of the present disclosure may also be applied to monitoring and controlling the execution of plugins or other software extensions in the context of other software applications and software services such as web browser plugins, scripts and background software run by web browsers (e.g., web browser service workers implemented in, for example, JavaScript and/or WebAssembly), system-level services, and the like.

An indexer service running on a computing device may encounter a wide variety of documents in the course of performing database updates, where these documents may store information in a variety of proprietary formats developed by first party or third party developers (e.g., entities other than the entity maintaining the indexing software service). A document may be a self-contained piece of work created with an application program and which may have a unique filename within a filesystem or other unique identifier within a data store, and where the document is associated with a document type (e.g., as indicated by an extension in the filename and/or by a schema or other header information in the file) indicating the format (or file format) of the document. Examples of such file formats include word processing document storage formats (e.g., Portable Document Format (PDF), DjVu, Microsoft® Word (DOCX), OpenDocument Format (ODF), Apple® Pages, and the like), video storage formats (e.g., avi, mkv, and the like), and archive file formats (e.g., 7z, cab, rar, tar, zip, and the like). Each different file format or data format may require a specialized parser or other mechanism to extract metadata and content data from documents in those formats. However, maintaining a specialized parser for each possible data format is a significant and resource-expensive undertaking.

A plugin framework alleviates the problem of maintaining a large number of parsers by delegating the data extraction to specialized plugins that are specifically designed to handle particular types of document. Accordingly, an indexer can index metadata and content from files encountered in the indexing process by delegating the extraction of the metadata and content to a corresponding plugin for the document type, where the plugin returns data to the indexer in accordance with a defined application programming interface (API). In the context of the Microsoft® Windows® Indexing Service, these plugins may be referred to as property handlers (e.g., implementing the IPropertyStore interface to extract properties or metadata from documents) and filter handlers (e.g., implementing the IFilter interface to extract content from documents), and, in the context of the Apple® MacOS® or iOS® Spotlight® service, may be referred to as Spotlight® Importers. File types may be identified by their extensions (e.g., the last portion of the filename, typically preceded by a period or dot (".") and/or by other type identifiers (e.g., "uniform type identifiers" in the case of filesystems used with Apple® operating systems).

These plugins for extracting data from various file types may be developed by parties having an interest in having those document types indexed. For example, a third party application may store data in a proprietary data format, and the developer of the third party application may create and maintain an indexer plugin for parsing that proprietary file format. Plugins may also be provided by a first party for commonly used file formats (e.g., JPEG images). However, as noted above, plugins may sometimes misbehave due to bugs or errors in the implementation of the plugin, difficulties in parsing particular documents (e.g., large, complex, and/or corrupted documents), or actual malicious intent on the part of the plugin developer (e.g., malware delivered as a plugin).

As such, examples of the present technology relate to systems and methods for monitoring the activity of plugins and managing the execution or running of plugins to improve computing performance and reduce or minimize the impact of misbehaving plugins on a user's experience when interacting with a computing system. In some examples, a plugin resource manager monitors the activity of plugins by requesting acknowledgements (ACKs) from the plugin while it is running (to check whether the plugin is hanging) and by measuring and recording the level of computing resources consumed by the plugin while running (e.g., CPU time, memory usage, input/output bandwidth usage, number of threads used). In some examples, a plugin resource manager manages the execution of plugins by terminating plugins that fail to respond, disabling problematic or misbehaving plugins, and scheduling or setting priorities on plugins based on historical resource usage and user activity patterns. For example, resource-heavy plugins may be scheduled to run during time periods when the computing device is connected to external power and the screen is turned off because the computing device is not actively being operated or used by a person. As another example, plugins that generate data that is frequently accessed by the users of the computing device may be prioritized to run more frequently and/or to run even when the computing device is under a load because that data is immediately relevant to the user (e.g., actively indexing documents that the user is frequently accessing).

FIG. 1 is a schematic block diagram of a plugin resource manager running in a host application or service process on a computing device, where the plugin resource manager manages the execution of one or more plugins by one or more worker processes according to an example of the present disclosure. In the example system architecture shown in FIG. 1, incoming tasks or events 102 are received by a first process or parent process associated with an application or service. As used herein, the term "task" may refer to a discrete unit of computational work that may be added to a queue and delegated to a worker process or thread. Examples of tasks include logging events (e.g., information, warnings, and errors) received by a logging system and hypertext transfer protocol (HTTP) requests received by a web server. In the case of an indexing service 108 running on a computing device (e.g., client device) including a processor and memory, the incoming tasks or events 102 may be file system change events (e.g., from the Update Sequence Number (USN) Journal or Change Journal when using a Microsoft® Windows NT file system (NTFS) on a Microsoft® Windows® operating system) relating to changes to data stored on a file system accessible to the computing device or change events relating to data changes at a location accessible to the computing device (e.g., a remote network location, such as a website).

A task scheduler 104 adds the received tasks 102 to a queue 106. The queue 106 may be a priority queue, where the task scheduler assigns priority values to the tasks 102 and arranges the tasks in the queue based on the assigned priority values. The task scheduler 104 may be executed by the first process (e.g., a main process associated with the application or service such as the indexing service 108). Tasks on the queue may then be processed by plugins 110 (e.g., handlers) configured to handle particular types of tasks. In the case of an indexer, each task 102 may correspond to a particular document or portion of a document where the type of the task corresponds to the file type or document format of the document (e.g., a Microsoft Word® document, a Portable Document Format document, an email document as presented, for example, by the Microsoft® Messaging Application Programming Interface (MAPI) or as stored in user directory in formats such as Maildir or mbox).

In the architecture shown in FIG. 1, when processing a particular task 102a, the task is provided to a second process 112 (e.g., a child process of the first process) that executes a plugin 110a that is configured to handle the particular task. The plugin 110a may be one plugin among multiple plugins 110 (e.g., including plugins 110B and 110C, as shown in FIG. 1), where different plugins are configured to perform different types of tasks. For example, in the case of an indexer, the task may be to extract content from a PDF file, in which case the second process executes plugin A 110A configured to read PDF files in order to extract content (e.g., properties and text) from the PDF file. The other plugins, plugin B 110B and plugin C 110C, may be configured to extract data from other types of files such as Microsoft® Word® documents (DOCX) and compressed archives such as ZIP files. Plugin A 110A may produce results or return values that are supplied back to the first process—for example, the content extracted from a document associated with the task 102a may be returned to the indexing service 108 to be added to an indexer database 114.

As noted above, plugins may sometimes misbehave by consuming excessive computing resources of the computing device, hanging, or performing malicious operations. These may include outright malicious plugins (e.g., malware), plugins that may crash or hang, and long running plugins that consume excessive resources. Thus, the plugin resource manager 120 or, more generally, resource manager 120, may be configured to monitor and manage the execution of plugins. In particular, some examples may provide a plugin isolation feature, which assists in isolating (e.g., sandboxing), monitoring, and controlling the execution of these plugins.

The above description of a system architecture is merely intended to provide context for explaining examples of the present disclosure. However, examples of the present disclosure are not limited thereto and may also be applied in other contexts and with different software architectures without departing from the spirit and scope of examples of the present disclosure.

Figure 2A:
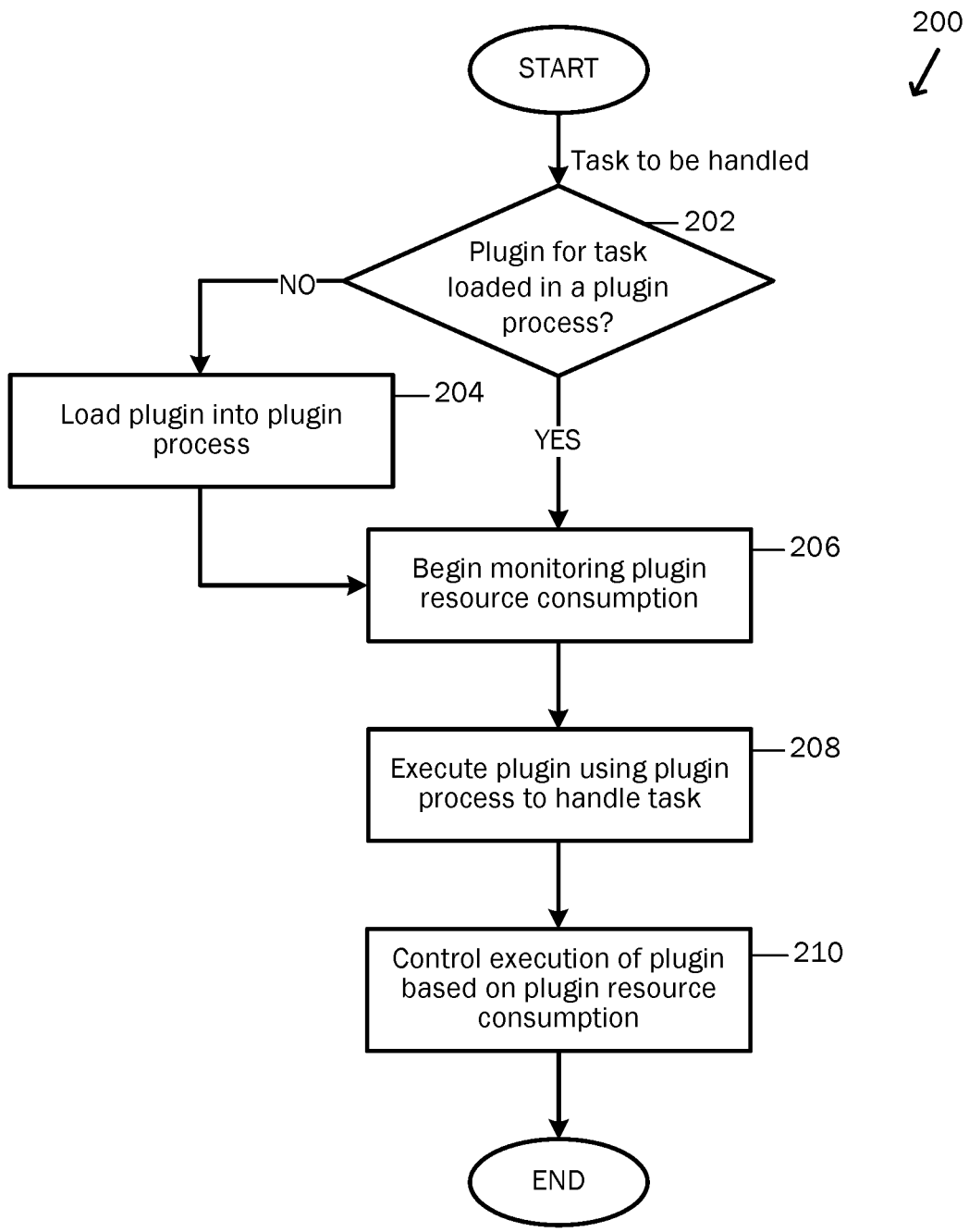
FIG. 2A is a flowchart depicting a method for monitoring a plugin and managing the execution of the plugin according to one example of the present disclosure.

FIG. 2A is a flowchart depicting a method 200 for monitoring a plugin and managing the execution of the plugin according to one example of the present disclosure. In more detail, when handling a task, the host application or host service running in a first process (e.g., indexer process 108) determines, in operation 202, whether a plugin for the task has been loaded into a plugin process 112 (e.g., a second process or child process). If not, then in operation 204, the second process 112 is controlled to load the plugin for handling the task. If, at operation 220, the plugin is already loaded, method 200 flows to operation 206.

In operation 206, the plugin resource manager 120 begins monitoring the plugin process 112 including collecting resource consumption metrics associated with the plugin. In operation 208, the plugin process 112 executes the plugin to handle the task while the plugin resource manager 120 monitors its execution. In operation 210, the plugin resource manager 120 controls the execution of the plugin based on the monitored resource consumption metrics of the plugin process 112 executing the plugin, such as by limiting the CPU cycles or memory that the plugin process 112 is permitted to use, terminating hung processes, and the like, as described in more detail below.

Figure 2B:
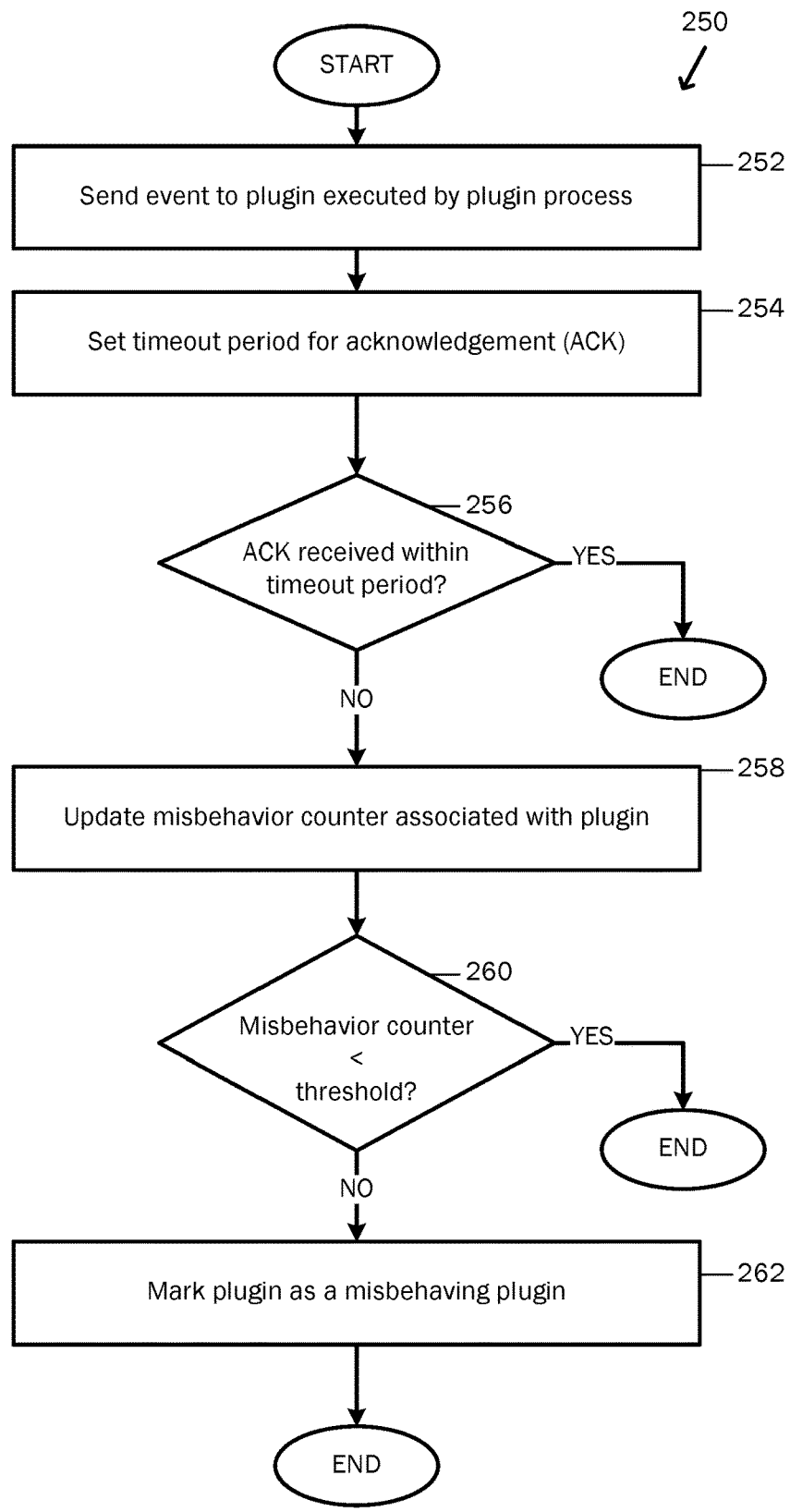
FIG. 2B is a flowchart depicting a method for monitoring a plugin by requesting acknowledgements (ACKs) from the plugin as part of the execution of the plugin according to one example of the present disclosure.

FIG. 2B is a flowchart depicting a method 250 for monitoring resource consumption metrics of a plugin by requesting ACKs from the plugin as part of the execution of the plugin according to one example of the present disclosure. In more detail, an internal watchdog process (e.g., the plugin resource manager 120) monitors one or more plugin processes 112 for ACKs, which may be transmitted to the plugin resource manager 120 via an inter-process communication (IPC) channel such as inter-process signals, sockets (e.g., a network interface), a message queue, a pipe (named or anonymous), message passing (e.g., Common Object Model (COM)) or the like. In some examples, the plugin resource manager 120 actively requests ACKs from the plugin process 112 via an IPC mechanism. In some examples, the API associated with a plugin expects ACKs to be sent in accordance with events such as the delivery of a task to a plugin or the delivery of chunks of data to the plugin (e.g., a file or stream of data to be processed may be divided into one or more chunks, and an ACK may be expected before and after each chunk of data is requested from the plugin).

In operation 252 of method 250, an event is sent to the plugin 110A executed by the plugin process 112 via an IPC channel. In various examples, the event may correspond to an explicit query for an ACK or an implicit query in the form of a newly delivered task 102A to the plugin 110A, a chunk of data delivered to the plugin 110A, or before and/or after a new task or chunk of data is requested by the plugin 110A. In operation 254, the plugin resource manager 120 sets an acknowledgement timeout period (or ACK timeout period, such as two minutes) based on the timestamp of the event (e.g., an amount of time elapsed since the event was sent to the plugin process). In operation 256, the plugin resource manager 120 determines whether an ACK was received from the plugin 110A within the timeout period. If the ACK is received within the timeout period, then the plugin is assumed to be behaving normally, or within normal parameters, and the process ends or repeats. If the plugin resource manager 120 did not receive an ACK within the timeout period, then, in operation 258, the plugin resource manager 120 updates or increments a misbehavior counter (e.g., initially set to 0) associated with the plugin (e.g., the value of the misbehavior counter is increased by 1). In some examples, the misbehavior counter may be initially set to a positive number and may be decremented toward a threshold value such as 0, or equivalents thereof. In operation 260, the plugin resource manager 120 determines whether the counter has reached a threshold value or threshold number of incidents of misbehavior (e.g., a threshold value of three). If the threshold value has not yet been reached or satisfied, then the method 250 ends (or repeats) with the misbehavior counter updated to the new value. If the threshold value has been satisfied, then, in operation 262, the plugin resource manager 120 marks or flags the plugin as a misbehaving plugin, and the process ends.

In some examples, when an ACK was not received within the timeout period, the plugin is terminated (e.g., the plugin process executing the plugin is terminated). In some examples, plugins marked as misbehaving plugins in operation 262 are no longer run (e.g., are disabled or blocked), such that tasks associated with misbehaving plugins are either dropped (and not handled) or deferred until a low-usage time when the misbehaving or high-consumption plugins can run. For example, the task scheduler 104 may ignore or drop tasks (e.g., not assign tasks) or assign a low priority to tasks that would be processed by misbehaving plugins. In the case of an indexer, a misbehaving plugin associated with a particular file type may be no longer loaded and content or property extraction may be avoided for data items or documents of a particular type, but basic properties and metadata may still be extracted by other mechanisms (e.g., other, non-misbehaving plugins associated with metadata extraction rather than extracting the content of the document) and these basic properties and metadata may still be added to the indexer database 114.

In some examples, the task scheduler 104 executes misbehaving plugins in accordance with a policy associated with misbehaving plugins, such as by executing the misbehaving plugins at a later time where computing resources are more likely to be available without providing a negative impact to an active user. For instance, the later time may be a time while there is no user active, while the computing device is plugged into external power with the screen turned off (e.g., screen on standby), and/or during particular times of the day (e.g., overnight). The later time may also be based on a number of backlogged tasks that require the misbehaving plugin to process. For instance, once a number of backlogged tasks exceeds a threshold, the misbehaving plugin may be given a higher priority in the queue.

In some examples, the plugin resource manager 120 configures a fallback plugin or fallback handler to be used instead of the misbehaving plugin to handle tasks that would otherwise be handled by the misbehaving plugin. The fallback plugin or fallback handler may have reduced or limited functionality when compared to the misbehaving plugin, such as extracting only metadata from a document rather than underlying content, or limiting the extraction of content to text strings in the document (e.g., without performing text recognition or optical character recognition on handwriting or images stored within the document because these operations may be more complex and computationally intensive than extracting text strings). By controlling the execution of plugins or extensions based on detecting the prior misbehavior, the impact of misbehaving plugins on the responsiveness of a computing device is reduced or otherwise minimized.

In the example shown in FIG. 1, multiple plugins 110, including plugin 110A, plugin 110B, and plugin 110C are shown as being run or executed by a same plugin process 112. However, examples of the present disclosure are not limited thereto and, in some examples, plugins are isolated from one another by being run in two or more separate processes, as described with reference to FIGS. 4B and 4C, below.

Figure 3A:
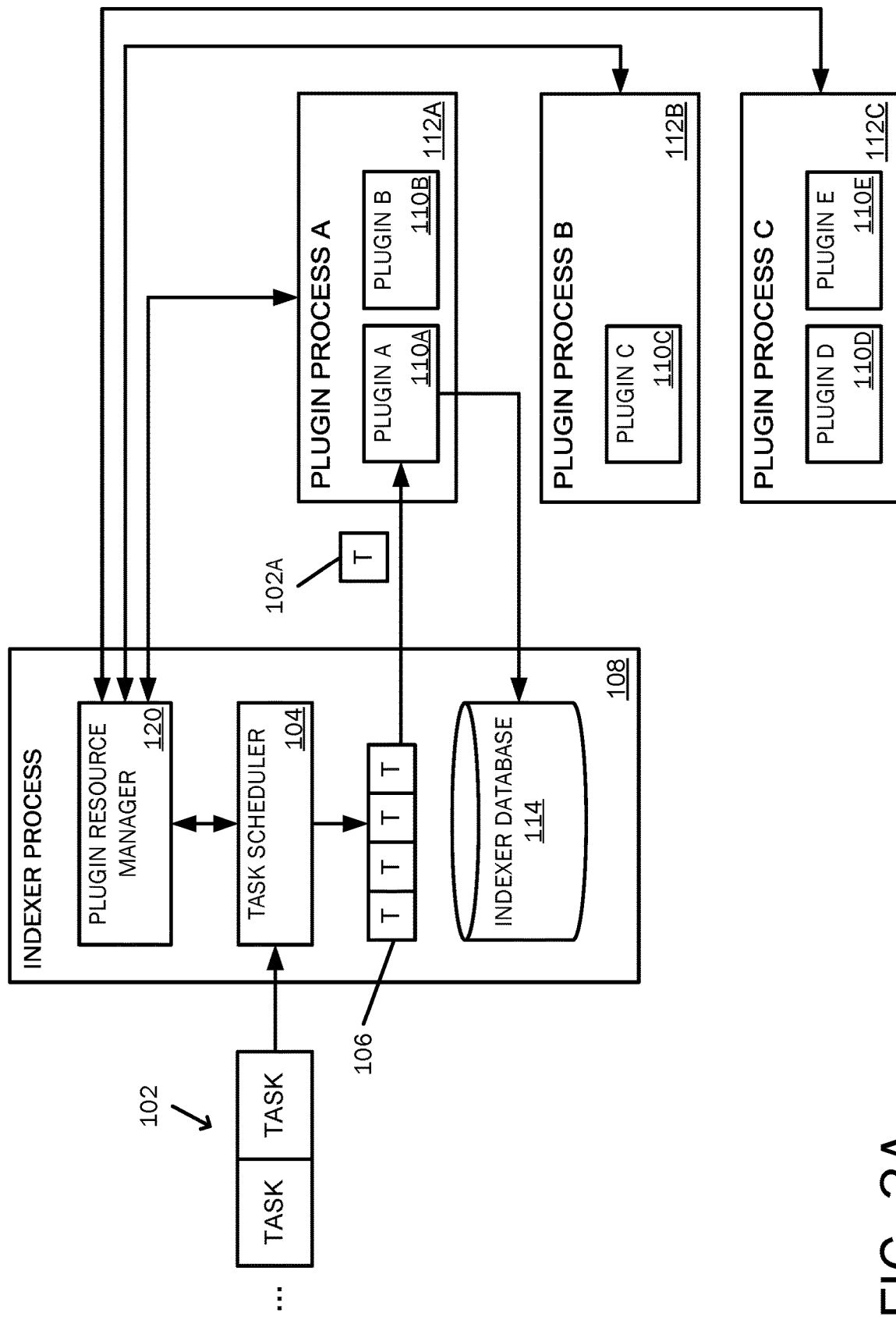
FIG. 3A is an example schematic block diagram of a plugin resource manager running in a host application or service process on a computing device.

FIG. 3A is a schematic block diagram of a plugin resource manager running in a host application or service process on a computing device. The plugin resource manager manages the execution of one or more plugins, and each plugin is assigned to a corresponding worker process or plugin process based on a plugin type of the plugin according to an example of the present disclosure. Like reference numerals in FIG. 3A refer to like components described above with respect to FIG. 1, and description thereof will not be repeated herein.

In the example shown in FIG. 3A, three different plugin processes 112 (plugin process A 112A, plugin process B 112B, and plugin process C 112C) are used to execute five different plugins 110 (plugin A 110A, plugin B 110B, plugin C 110C, plugin D 110D, and plugin E 110E). The plugins are assigned to different plugin processes 112 for execution based on their plugin type or plugin classification. In some examples, first party plugins are executed by a first plugin process (e.g., plugin A 110A and plugin B 110B executed by plugin process A 112A), where plugins are assumed to be high quality and unlikely to misbehave, while trusted third party plugins (e.g., plugins that have been evaluated and tested for quality assurance) may be executed by a second process (e.g., plugin C 110C executed by plugin process B 112B). Unknown or untested plugins may be executed by a third plugin process (e.g., plugin D 110D and plugin E 110E executed by plugin process C 112C) in order to isolate the impact of plugins that may have a higher likelihood of misbehaving.

As another example, the different plugins may be separated based on the functions performed by the plugins. As one example, in the context of an indexer in Windows® Search, plugin process A 112A is configured to execute all custom property handlers (e.g., implementing the IPropertyStore interface), plugin process B 112B is configured to execute all custom filter handlers (e.g., implementing the IFilter interface), and plugin process C 112C is configured to execute all other handlers (e.g., special cases, such as custom protocol handers that can load and run filter handlers directly).

By isolating different types of plugins in separate processes, a misbehaving plugin that caused the process executing the plugin to hang would have a reduced impact on the execution of plugins in other processes. For example, if plugin D 110D crashed or caused plugin process C 112C to hang or crash, the plugins executed by plugin process A 112A and plugin process B 112B could still be run, thereby enabling tasks 102 on the queue 106 that would be processed by plugin A 110A, plugin B 110B, or plugin C 110C to continue to be handled during the hang or crash of plugin process C 112C caused by plugin D 110D.

The plugin resource manager 120 may monitor the execution of the plugins shown in FIG. 3A in a manner similar to that described above with respect to FIG. 2B by waiting for ACKs from running plugins via IPCs between the plugin resource manager 120 and the plugin processes 112. As such, the plugin resource manager 120 may mark or flag plugins as misbehaving plugins when those plugins fail to respond with an ACK within a timeout period. As noted above, in some examples, plugins marked as misbehaving plugins may be disabled or rescheduled to run at particular time periods based on policies implemented by the task scheduler 104 regarding the execution of misbehaving plugins.

Figure 3B:
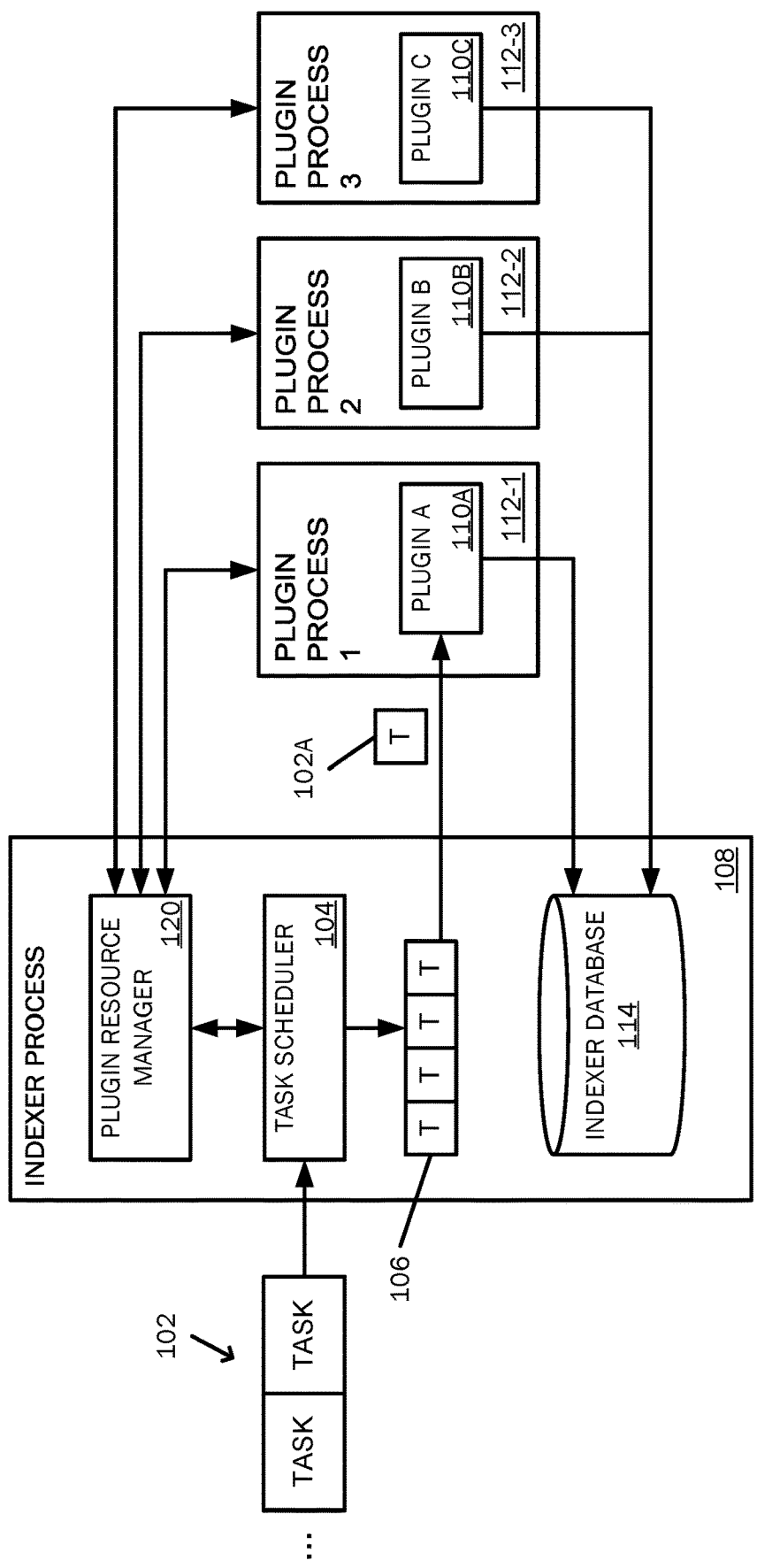
FIG. 3B is another example schematic block diagram of a plugin resource manager running in a host application or service process on a computing device.

FIG. 3B is a schematic block diagram of a plugin resource manager running in a host application or service process on a computing device. The plugin resource manager manages the execution of one or more plugins. Each plugin is assigned to a corresponding, separate worker process or plugin process according to an example of the present disclosure. Like reference numerals in FIG. 3B refer to like components described above with respect to FIG. 1 and description thereof will not be repeated herein.

FIG. 3B is similar to the example of FIG. 3A, but differs in that each plugin 110 runs in its own process 112. For example, plugin A 110A is executed by a dedicated plugin process 1 112-1, plugin B 110B is executed by a dedicated plugin process 2 112-2, and plugin C 110C is executed by a dedicated plugin process 3 112-3. While FIG. 3B shows a case with three plugin processes 112, examples of the present disclosure are not limited thereto and more than three plugin processes (or fewer than three plugin processes) may be used to execute corresponding plugins. In some circumstances, the number of plugins available in the system to handle different types of tasks 102 may exceed the number of plugin processes 112 (e.g., the software architecture may set a cap on the number of plugin processes 112, such as a maximum of 10 total plugin processes). In such circumstances, if a task 102 requires the use of a plugin that is not currently loaded by one of the plugin processes 112, one of the existing plugin processes may be recycled (e.g., the plugin currently loaded by the existing plugin process is unloaded, and the new plugin is loaded in its place).

Figure 3C:
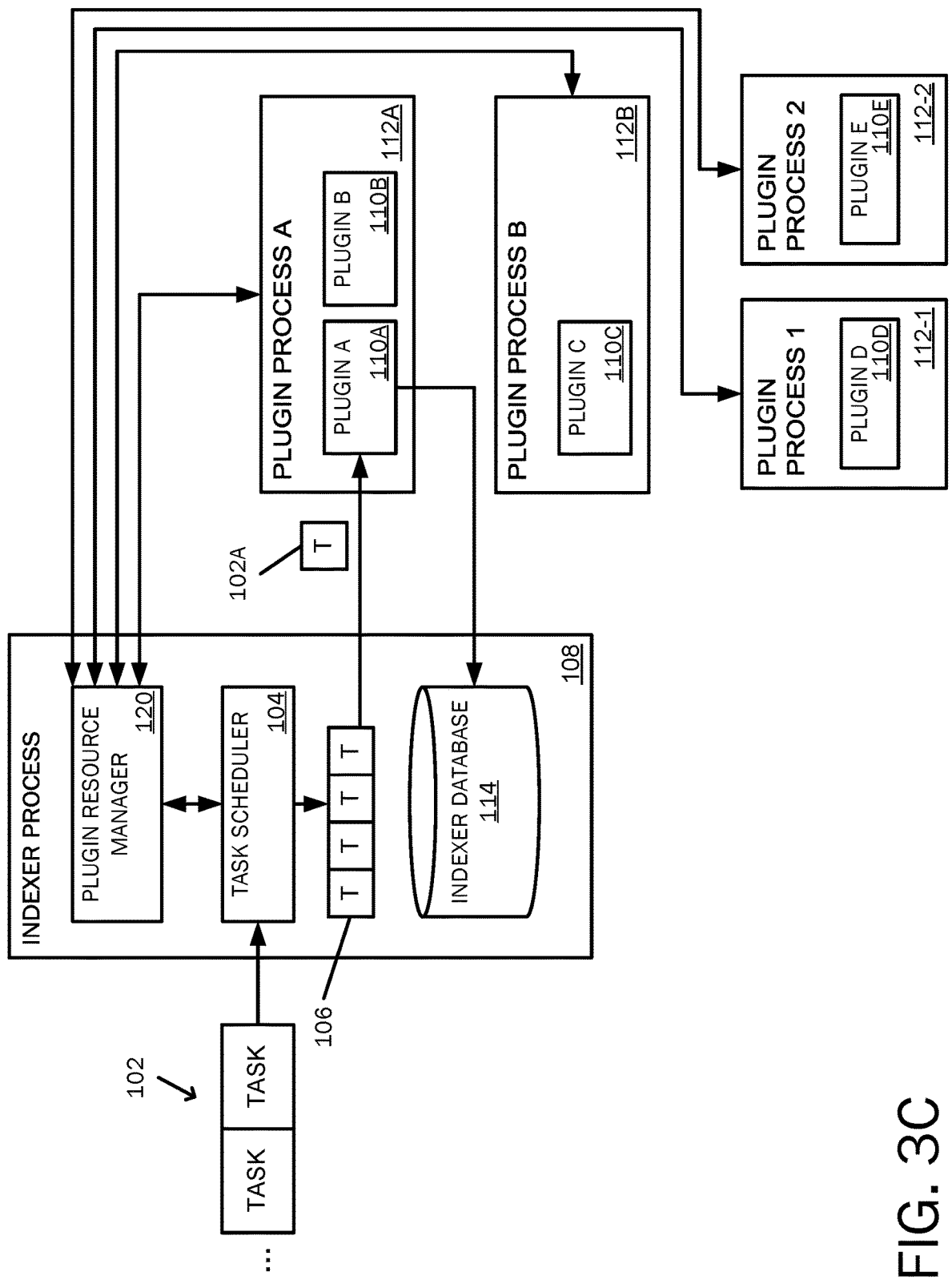
FIG. 3C is another example schematic block diagram of a plugin resource manager running in a host application or service process on a computing device.

In some examples of the present disclosure, only some categories of plugins are isolated on a one-plugin-per-process basis (e.g., exactly one plugin is loaded in the process at a given time). FIG. 3C is a schematic block diagram of a plugin resource manager running in a host application or service process on a computing device, where the plugin resource manager manages the execution of one or more plugins, in which some types of plugins are assigned to shared processes and some types of plugins are assigned to corresponding, separate worker processes or plugin processes according to one example of the present disclosure. In the example shown in FIG. 3C, plugin A 110A and plugin B 110B are of a first plugin type (or first handler type) that are executed by a shared plugin process A 112A, and plugin C 110C is of a second plugin type (or second handler type) different from the first plugin type and is executed in a second shared plugin process 112B (which may be shared with other plugins of the second plugin type, although not shown in FIG. 3C). Plugin D 110D and plugin E 110E are of a third plugin type that is treated differently in that each plugin of the third plugin type is executed in its own plugin process, plugin process 1 112-1 and plugin process 2 112-2, respectively, without sharing the processes with other plugins. For example, the first plugin type may correspond to first party plugins, the second plugin type may correspond to certified third party plugins (e.g., tested in a controlled environment and certified as being well-behaved), and the third plugin type may correspond to untrusted (e.g., not certified) plugins. As another example, in the context of an indexer for Windows® Search, the first plugin type may correspond to property handlers, the second plugin type may correspond to unknown handlers, and the third plugin type may correspond to filter handlers, such that property handlers are executed by a first shared plugin process 112A, unknown handlers are executed by a second shared plugin process 112B, and each filter handler is executed by a separate plugin process (e.g., plugin process 1 112-1 and plugin process 2 112-2).

Some aspects of examples of the present disclosure relate to systems and methods for collecting metrics or telemetry regarding computing resources consumed by plugins during execution. These collected metrics may include, but are not limited to: memory usage needed to run (e.g., peak memory usage and average memory usage), total CPU cycles spent (e.g., real CPU time consumed), total duration spent in user-mode and kernel-mode, number of threads used by the process, and number of items or tasks the plugin was used to process during a particular run.

Monitoring the resource consumption of individual plugins is more challenging when a single process is executing multiple plugins, potentially in multiple threads. In particular, operating systems typically collect metrics or telemetry regarding computing resource usage (e.g., CPU time or cycles, memory usage, input/output usage, thread count, and the like) on a per-process basis. As such, when multiple plugins run in a same shared process, it may be difficult to attribute the resources consumed by the shared process to the particular plugins run by that shared process without resorting to deeper inspection and analysis (e.g., profiling the process using a profiler, which may periodically sample the state of the process and operations being executed by the process at the time of each sample), which may impose inspection overhead and negatively impact the performance of executing plugins by the inspected plugin process. More concretely, in the arrangement shown in FIG. 1, it may be difficult for the plugin resource manager 120 to determine the relative contributions of plugin A 110A, plugin B 110B, and/or plugin C 110C to the overall resource consumption of the plugin process 112.

On the other hand, when each process is limited to running a single plugin (one plugin-per-process, such as in the case of plugin process 1 112-1, plugin process 2 112-2 and plugin process 3 112-3 as illustrated in FIG. 3B or plugin process 1 112-1 and plugin process 2 112-2 as illustrated in FIG. 3C, all of the resources consumed by such a plugin process can be attributed to the single plugin running therein. This simplifies the process of collecting resource consumption metrics (or plugin "telemetry") on a per-plugin basis.

Figure 4A:
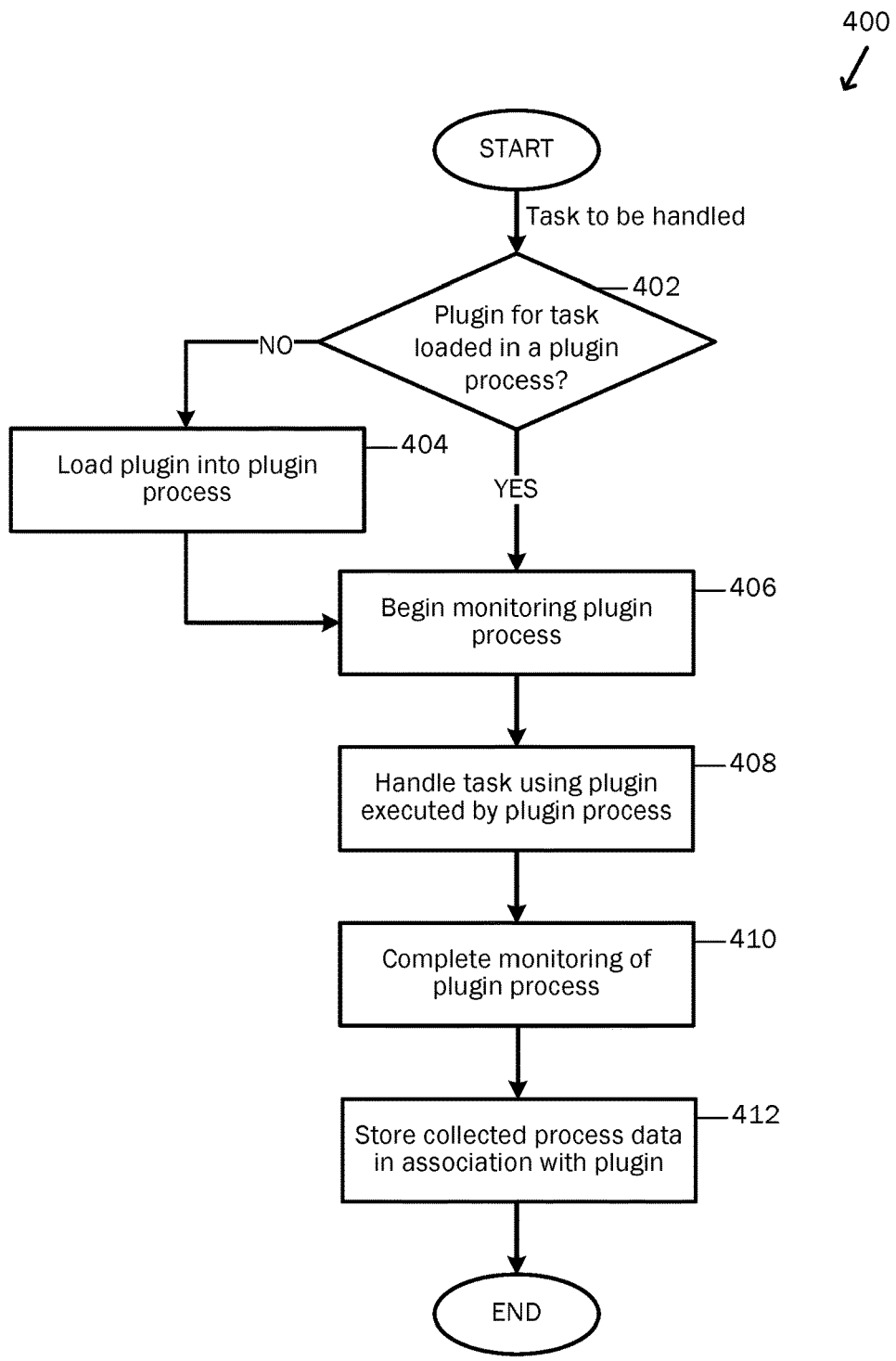
FIG. 4A is a flowchart depicting a method for monitoring the computing resource consumption metrics of a plugin during execution according to one example of the present disclosure.

FIG. 4A is a flowchart depicting a method 400 for monitoring the computing resource consumption metrics of a plugin during execution according to an example of the present disclosure. In the example context of an indexer, as described above, an incoming filesystem level file change event corresponds to an incoming task 102. The indexer process 108 determines the corresponding plugin to handle the task based on the type of task (e.g., extracting content from an email versus a PDF document versus a Word document may each be handled by a different corresponding plugin), and the incoming task is scheduled by a task scheduler 104, which sets a priority level on the task in accordance with an execution policy, and the task is assigned a position in a queue 106 based on its assigned priority. The execution policy may generate different outputs based on a current state (or "execution window") of the computing device, such as where some plugins may have higher priority during a "screen off, external power" window and a lower priority during a "screen on, battery power" window or a "screen on, running a game application" window. Execution policies will be described in more detail below. A next task for handling or process is taken (e.g., "popped" or "dequeued") from the head of the queue, where the head of the queue corresponds to the current highest-priority task.

Referring to FIG. 4A, in operation 402, the plugin resource manager 102 determines whether a plugin for handling the task to be handled (from the head of the queue 106) has been loaded into a plugin process 112. If not, then in operation 404, the appropriate plugin is loaded into a plugin process (e.g., by recycling a plugin process to unload its current plugin and to load a new plugin). If the plugin has been loaded, then method 400 flows to operation 406.

In operation 406, the plugin resource manager 120 begins monitoring the plugin process that will handle the task. In various examples, the monitoring includes storing metrics regarding the CPU usage (e.g., CPU time or cycles), memory usage, input/output device bandwidth usage (e.g., on a per-device basis, such as local storage bandwidth and network bandwidth), thread count, number of items processed (e.g., if more than one task is handled during a run), total duration of time spent in user mode and kernel mode, and the like. For example, in Unix-like and BSD-like systems such as Linux, MacOS®, iOS®, and Android®, these statistics regarding resource usage by a particular process may be accessed using calls to sysctl or libproc (such as through proc_pidinfo) and/or read from the "proc" pseudo-filesystem (typically mounted at "/proc") in a subdirectory corresponding to the process id (pid) of the process running the plugin or may be read using a tool configured to collect and print information from the proc pseudo-filesystem. As another example, in Microsoft® Windows® systems, these statistics regarding resource usage by a particular process may be accessed through APIs such as the GetProcessMemoryInfo available through the psapi.h header (the Process Status API), the GetProcessTimes function available through the processtthreadapi.h header, and the QueryProcessCycleTime function available through the realtimeapiset.h header. In some examples, the monitoring of a plugin or handler as described below includes setting timeouts and receiving acknowledgements from a plugin as described above with reference to FIG. 2B. The collected metrics may also include other information about the computing device, such as processor model, number of cores, overall CPU usage, total installed memory, overall memory usage, swap memory usage, storage device types (e.g., flash memory, hard disk drive, and interface type such as PCIe versus SATA versus MMC), and the like.

In operation 408, the plugin process 112 handles the task, such as processing one or more chunks of data from a document to extract metadata and/or content in the case of a plugin for an indexer service. In operation 410, the plugin resource manager 120 completes its monitoring of the plugin process 112 (e.g., after the plugin process has finished the task or finished some portion of the task or after some specified interval). In operation 412, the plugin resource manager 120 stores the collected metrics regarding the resource consumption of the process executing the plugin that was used to handle the current task, where the resource consumption metrics are stored in association with the plugin (e.g., a Windows® class identifier, name and version of the library, or other identifier specifying the particular plugin that was executed), and the process ends. Thus, the present technology is able to collected telemetry from the execution of plugins on a particular monitored computing device on a per-plugin basis.

Some aspects of examples of the present disclosure relate to training statistical models or machine learning models controlling the execution policies of plugins, where the models are trained based on the plugin execution metrics collected in accordance with methods such as those described with respect to FIG. 4A. The training of the model may be performed locally on the computing device (e.g., the same computing device running the plugins), may be executed by one or more servers 715 (see FIG. 7, below), or combinations thereof (e.g., with a general model trained by one or more servers 715 and re-trained locally based on local plugin resource consumption metrics or based on a federated training process).

Figure 4B:
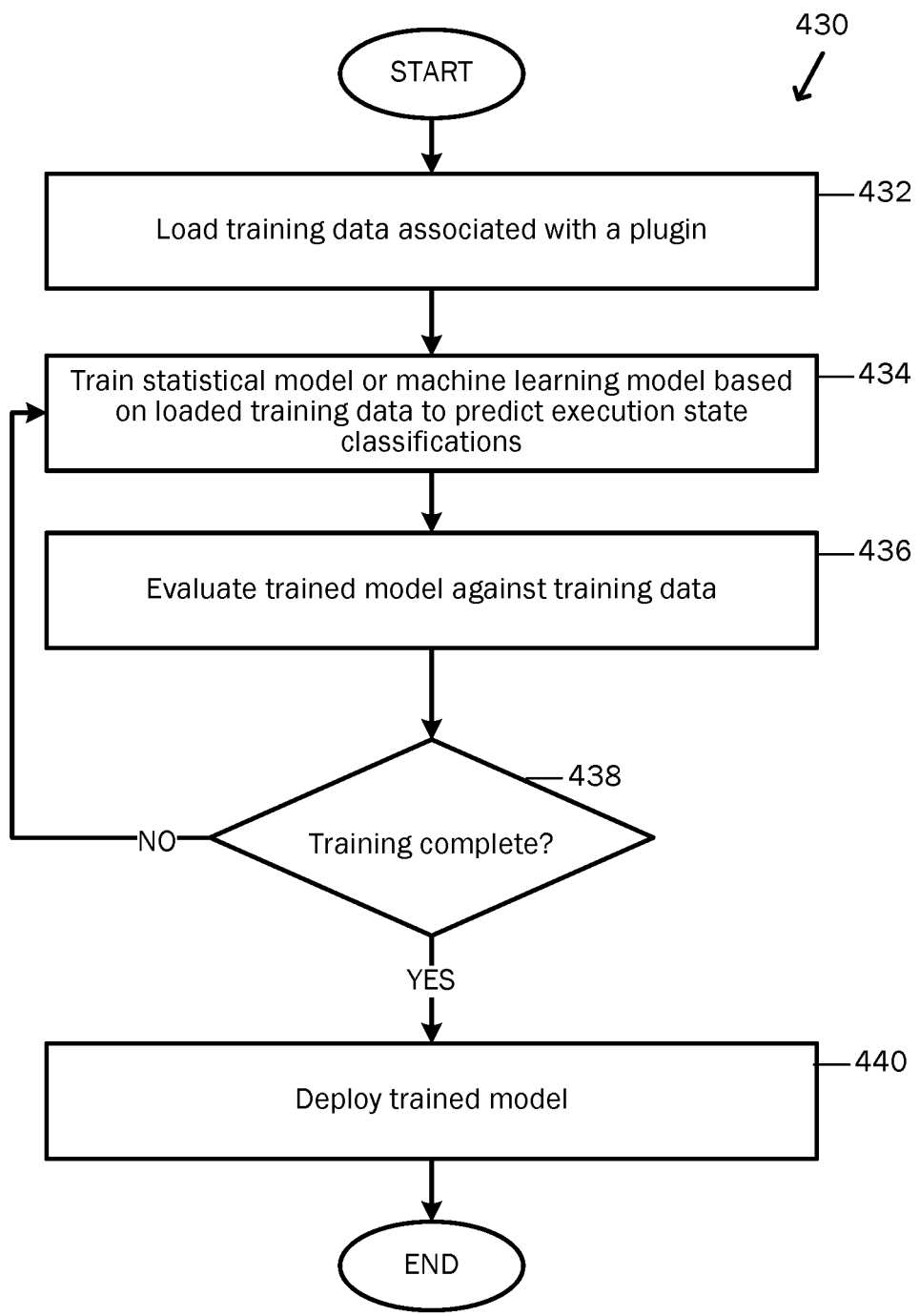
FIG. 4B is a flowchart depicting a method for training a model for predicting an execution policy for a plugin based on collected plugin data according to one example of the present disclosure.

FIG. 4B is a flowchart depicting a method 430 for training a model for predicting an execution policy for a plugin based on collected plugin resource consumption metrics according to an example of the present disclosure. While some examples of the present disclosure relate to developing training a statistical model controlling an execution of a single plugin, examples of the present disclosure are not limited thereto and may also be applied to training general models for setting execution policies of a plurality of different plugins. For the sake of convenience, examples of the present disclosure are presented below in the context of a model training system running on a server, but examples of the present disclosure are not limited thereto and the operations of FIG. 4B, and equivalents thereof, may also be performed locally on the computing device.

In operation 432, a model training system 720 (see, e.g., FIG. 7) loads training data including telemetry data collected from one or more computing devices regarding the execution of a particular plugin. As noted above, the telemetry data may include resource consumption metrics of the plugin during execution (CPU, memory, input/output (I/O), number of threads, number of items processed) and information about the physical computing resources available in the computing device (e.g., processor speed, total installed memory, total CPU load and memory load at the time of executing the plugin, etc.). In some examples, the training data further includes plugin usage information based on the activities of users of the computing device. The usage behavior includes, for example, the frequency in which users make use of particular plugins or make use of information generated by particular plugins. As a concrete example, a PDF plugin may be configured to extract content from PDF documents such that queries for various search terms will generate search results that include PDF documents that include those search terms. Usage information associated with the PDF plugin includes the frequency with which a user performs such searches to search for PDF documents containing particular text strings and/or the usage patterns of PDF documents overall (e.g., whether the user frequently or rarely uses PDF documents).

In some examples, each sample in the training data is labeled in accordance with an execution mode for the plugin corresponding to the particular conditions of the sample. Examples of execution state classifications include: "run," "do not run," and "conservative run." In more detail, a sample of the training data may be classified as "run" to indicate that the particular plugin should always be run under the particular conditions of the sample (e.g., because running the plugin has negligible impact on the overall performance of the computing device). A sample may be classified as "do not run" if the plugin misbehaved during that particular sample (e.g., failed to send an acknowledgement to the plugin resource manager, hung the plugin process and/or the computing system during execution, consumed excessive resources, and the like). A sample may be classified as "conservative run" in circumstances where a plugin does useful work, but its high resource demands on the computing device indicate that it the proper policy is to run the plugin at times when the computing device is inactive (e.g., screen off and plugged into external power, such as while charging overnight) and/or run the plugin with additional resource constraints (e.g., limiting the plugin process executing the plugin to a particular cap on CPU cycles, memory usage, input/output bandwidth, temperature, and/or, if applicable, cooling fan speed). In some examples, resource consumption constraints are applied to particular plugins by setting limits or constraints on the plugin processes 112 (e.g., no more than 20% of CPU time) when executing those particular plugins. In some examples, a plugin process that is constrained based on the plugin execution policy of a plugin are configured on a one plugin-per-process model, such that the constraints are narrowly applied to the particular misbehaving plugin. Additional examples of execution state classifications include "run immediately" (e.g., for data that is needed by an application running in the foreground), "run when more resources are available," and "run when user away." The execution state classifications or execution state labels may be assigned to various samples based on the particular resource consumption characteristics of the plugin and the computing resources available in the computing device (e.g., the load of the computing device) at the time of executing the plugin (e.g., prior to executing the plugin). The computing resources available may vary greatly between different computing devices based on the hardware resources installed in the computing device (e.g., the model and clock speed of the processor or processors, the total amount of installed memory, the maximum bandwidth of peripheral buses connecting input/output devices to the processor, and the like). As a result, a same plugin may be assigned a label of "run" in data samples associated with resource-rich computing devices (e.g., having large amounts of installed memory and fast processors with many cores) and may be assigned a label of "run when user away" or "run when more resources are available" in data samples associated with computing devices having fewer computing resources (e.g., resource-constrained computing devices having only smaller amounts of memory and slower processors with fewer cores).

In some examples, each sample in the training data is labeled with a priority value corresponding to the priority value that would be used to insert or sort the task into a priority queue. For example, tasks that can be handled or run immediately may be assigned high priority (e.g., because they have little to no impact on the overall performance of the computing device), and tasks that should not be run may have labels corresponding to very low priority values (e.g., because they may cause the computing device to hang, crash, thrash, or otherwise adversely impact the experience of the user). In some examples, each sample includes the current state or current execution window of the computing device, such as the current load on the computing device or whether a user is active (and playing a game versus using a web browser) or whether a user is away (e.g., screen off), and the labels associated with these samples may differ in accordance with different states of the computing device as associated with the sample. For example, a task that would be handled by a resource-intensive plugin may be labeled with a low priority when the sample indicates that the computing device is in a "user active" state, and the same task may be reassigned a higher priority the data in the sample indicates that the user is away from the computing device (e.g., the screen is off).

In some examples, the labels are generated automatically, such as based on the resource usage metrics collected from the computing device during execution of the plugin by a particular process, information regarding the responsiveness of a plugin in generating ACKs, and/or information regarding crashes or hangs by the process during the execution of plugins.

In operation 434, the model training system 720 trains a statistical model or machine learning model based on the labeled training data to predict execution state classifications (e.g., "run," "do not run," and "conservative run") corresponding to particular input features or an input feature vector including a plurality of input features. Examples of types of statistical models and types of machine learning models that may be used in accordance with examples of the present disclosure include, but are not limited to: a logistic regression model, a support vector machine (SVM), a neural network (including a deep neural network), and the like. The input features to the model may include a set of conditions under which the plugin resource manager 120 may determine whether or when to run a particular plugin (e.g., conditions such as computing resources available on a computing device, load on the computing resources of the computing device, characteristics of a task such as size of a document to be processed, collected plugin usage characteristics by a particular user). In examples in which a general model is trained, input features may also include characteristics of the plugin, such as an identifier (e.g., name and version number) associated with the particular plugin. The training of the model in operation 434 includes iteratively updating the parameters of the model to reduce a difference (or error) between the labels of the training data and the labels predicted or computed by the model.

In operation 436, the model training system 720 evaluates the current version of the trained model against the training data, such as a validation set of samples from the training data, where the portion of the training data used to train the model in operation 434 does not include the validation set. In operation 438, the model training system 720 determines whether training is complete, such as based on whether the training of the model has converged (e.g., performance of the model as determined in operation 436 has plateaued) or if a maximum number of training iterations (or training epochs) has been reached. If training is not complete, then the model training system 720 returns to operation 434 to continue training, such as by refining the model based on the same training data or by using additional training data. If training is complete, then in operation 440 the model training system 720 deploys the trained model, such as by finalizing the model to be delivered to the plugin resource managers 120 of computing devices to use the model to control the execution of plugins.

Figure 4C:
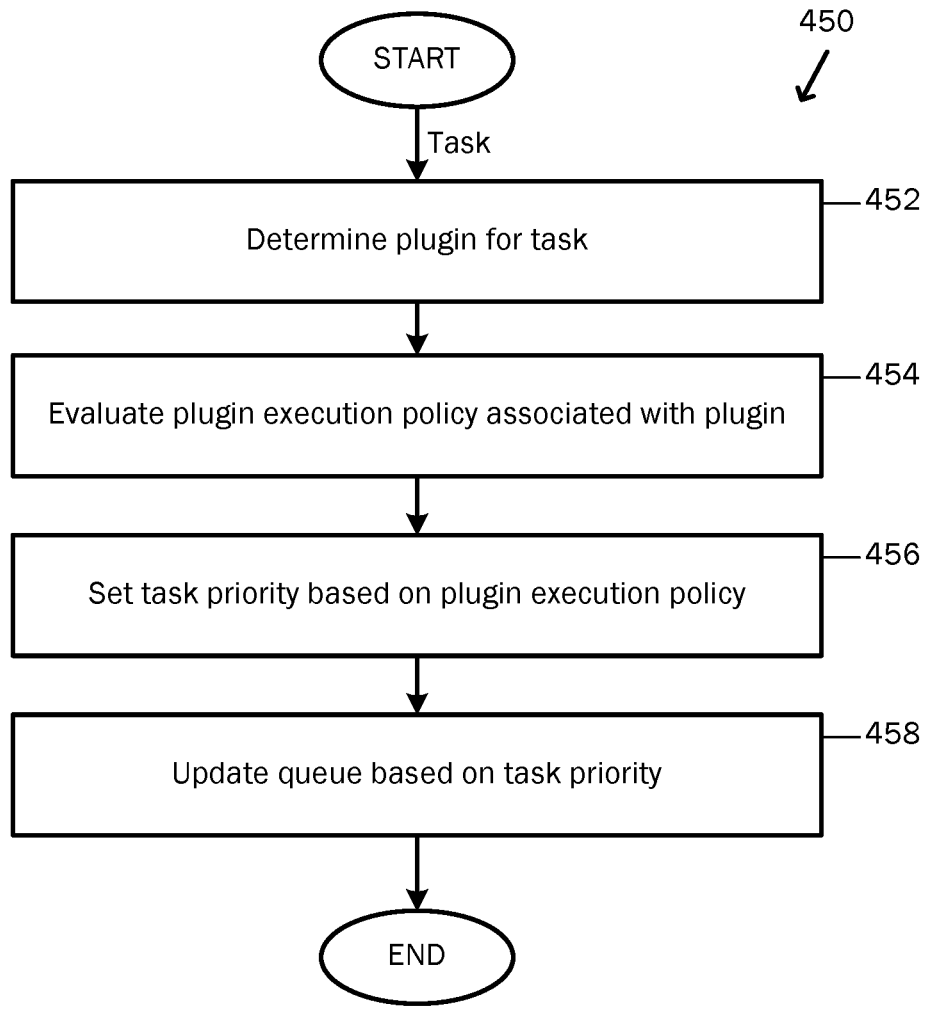
FIG. 4C is a flowchart depicting a method for updating a queue based on setting the priority of a task in accordance with a plugin execution policy determined based on historical behavior of the plugin according to one example of the present disclosure.

FIG. 4C is a flowchart depicting a method 450 for updating a queue based on setting the priority of a task in accordance with a plugin execution policy determined based on historical behavior of the plugin according to an example of the present disclosure. In some examples, the task scheduler 104 communicates with the plugin resource manager 120 to set the priorities of tasks based on a plugin execution policy managed by the plugin resource manager 120, and in some examples the task scheduler 104 accesses the plugin execution policy directly. For the sake of convenience, the operations 450 will be described in the context of examples where the assignment of priorities to tasks is managed by the task scheduler 104, but examples of the present disclosure are not limited thereto.

In operation 452, the task scheduler 104 determines a plugin for handling a particular task. For example, in the context of an indexer, the task may be the indexing of a new or changed document (e.g., a new email or an edit to a word processing document) stored in a filesystem or data store, in which case the plugin is configured to handle the extraction of content from the document (e.g., a plugin to extract metadata and/or content from an email).

In operation 454, the task scheduler 104 evaluates a plugin execution policy associated with the plugin determined in operation 452. The evaluation of the plugin execution policy includes supplying a feature vector representing the current state of the computing device to a trained model (e.g., a trained statistical model or machine learning model as trained in accordance with methods described above with FIG. 4B based on metrics or telemetry collected in accordance with the methods of FIG. 4A). In some examples, the trained model generates a classification of the task (e.g., "run," "do not run," or "run conservatively") in which case the task scheduler 104 sets a priority for the task based on the classification. Continuing the above example, the task scheduler 104 may set a high priority in the case where the trained model outputs "run" for the current condition, a very low or negative priority when the trained model outputs "do not run." In some cases, the task scheduler 104 also sets a low or negative priority when the trained model returns "run conservatively" or may set a moderate or medium priority for such tasks while also setting additional limits or quotas on the plugin process 112 executing the plugin when handling the task.

In some examples, the trained model returns different values for a given plugin depending on the state of computing device. As noted above, the input features to the trained model include the conditions under which the plugin may be run, such as the computing resources available on the computing device and the current load on those computing resources and the plugin usage patterns by the user or users of the computing device. Therefore, trained model may determine that it is acceptable to run a plugin immediately if the computing device is only lightly loaded (e.g., currently has CPU, memory, and input/output bandwidth resources available), thereby evaluating to a plugin execution policy of "run" or a high priority value, whereas the trained model may determine that a plugin should not be run if the computing device is under a heavy load or under duress (e.g., currently has high CPU usage, high memory usage, and/or the input/output communication channels are saturated) or if the computing device is operating in a performance mode that disables or postpones other tasks (e.g., while the computing device is executing a game application), thereby evaluating to a plugin execution policy of "do not run" or a low priority value. In addition, in some examples, the input features include plugin usage patterns by users of the computing device, such that the trained model generates higher priority values (or classifications associated with higher priority values) for plugins that generate frequently used data (e.g., in an indexer, plugins that index data that is frequently searched by the user), such that tasks associated with those plugins are assigned higher priority and prioritized. As such, the limited resources of resource-constrained computing devices is allocated first to work that is more likely to be useful to the user, as predicted based on previous user behavior.

In operation 456, the task scheduler 104 sets a priority on the task based on the evaluation of the plugin execution policy computed in operation 454. In operation 458, the task scheduler 104 updates the queue based on the set task priority. For example, a new task may be inserted into the queue 106 based on its assigned task priority. As another example, the task scheduler 104 may recompute priorities for all of the tasks in the queue based on changes in the state of the computing device, such as transitioning from a "battery power" state to an "external power" state, because changes in state may allow resource intensive plugins to run (e.g., when moving from battery powered to externally powered or from "screen on" to "screen off") or may mean that resource intensive plugins should not be run (e.g., when moving from external power to battery power or when waking from an "idle" state to an "active" state). For instance, following operation 458, operations 454 through 458 may be repeated on a continuous, interval, or event-based basis. For instance, the plugin execution policy may be the re-evaluated at a second time when the state of the computing device has changed. As such, due to the change in the state of the computing device, the priority of the task to be processed by the identified plugin may be changed. The re-evaluation of the plugin execution policy may be performed every few seconds, minutes, or some other set time interval. In other example, the re-evaluation of the plugin execution policy may be triggered based on a change in the state of the computing device. For example, if a computing state indicator (e.g., CPU usage, screen state) deviates by a set amount from the value when the plugin execution policy was first evaluated, the plugin execution policy may be re-evaluated, a priority for the task may be updated based on the re-evaluation of the policy, and the queue may be updated accordingly. In some circumstances, a change of state may occur during the processing or handling of a task and the task being processed, in addition to other tasks in the queue, may be assigned new priorities. In some examples, when the queue contains a higher priority task than the task being processed, that task is paused or interrupted and re-inserted into the queue, and the higher priority task may be executed instead.

Accordingly, aspects of examples of the present disclosure relate to collecting telemetry regarding the execution of plugins to develop plugin execution policies on a per-plugin basis (e.g., trained statistical models) and using the plugin execution policies to determine conditions (e.g., whether the computing system is under heavy load versus under a light load or active versus inactive) under which the plugins are allowed to run or not allowed to run. In some examples of the present disclosure, the policy takes the plugin usage statistics (e.g., whether particular types of files are frequently searched or used) as input to determine whether and when the plugins should be run (e.g., index frequently used data types may be indexed more often and first, while infrequently used data types may be indexed less frequently or last).

As such, aspects of examples of the present disclosure relate to applications of machine learning to determine whether to run a plugin based on historical resource consumption by the plugin (from collected telemetry), computing device loads, historical user activity (e.g., plugin usage statistics by the user), and current usage conditions (e.g., current state or mode of operation of the computing device, such as "battery powered," "connected to external power," "screen off," and "running a game application"). These models may be trained based on aggregated resource consumption metrics across many users and many configurations of computing devices (e.g., different processors with different clock speeds and numbers of cores and different amounts of memory). Accordingly, the plugin execution policy for any given plugin may be fine-tuned based on the capabilities and load of the computing device, the usage behavior of the current user, and/or the preferences of the current user, among other factors.

Figure 4D:
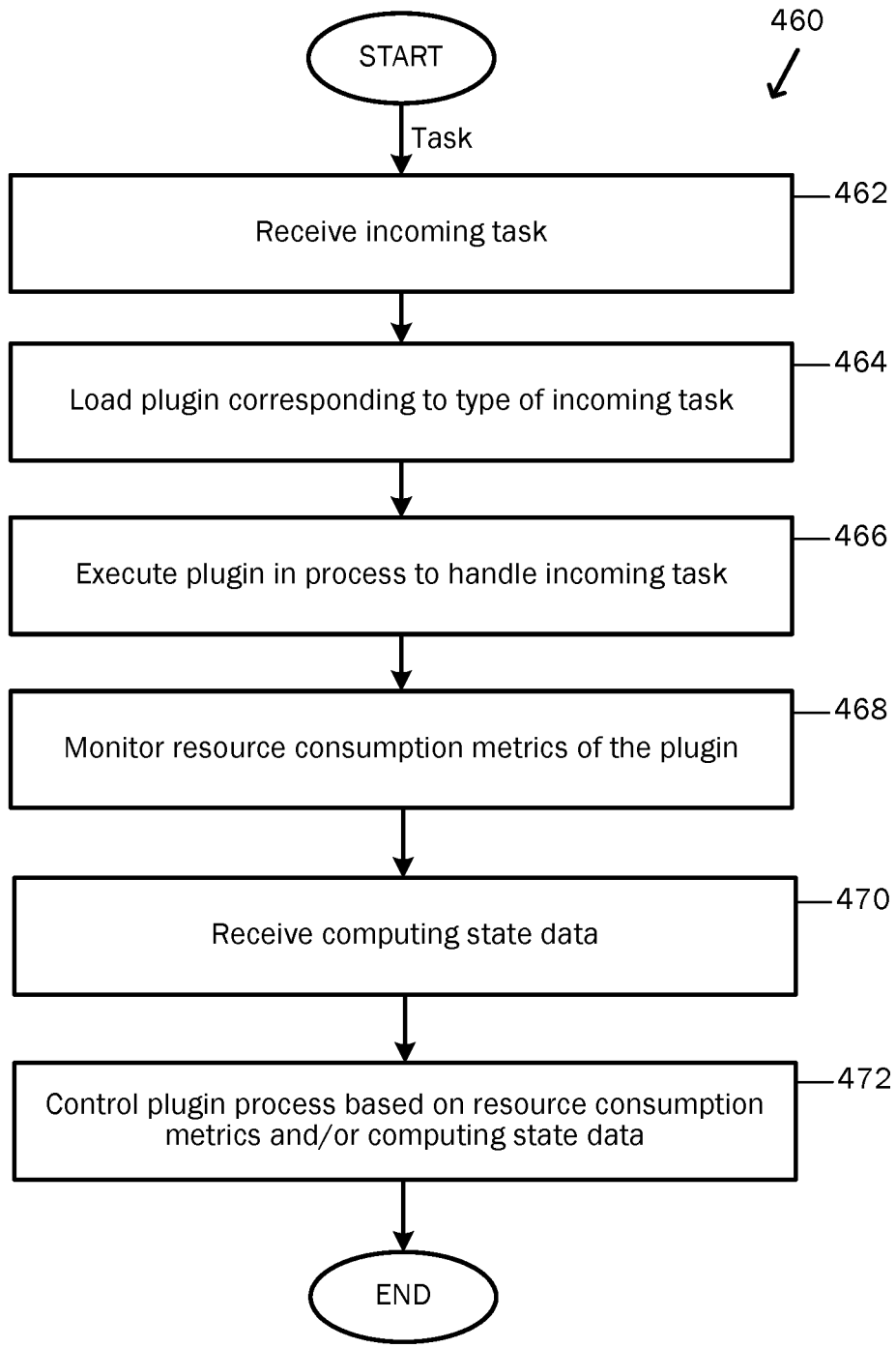
FIG. 4D is a flowchart depicting a method for controlling a plugin process according to an example of the present disclosure.

FIG. 4D is a flowchart depicting a method 460 for controlling a plugin process according to an example of the present disclosure. At operation 462, an incoming task is received. The incoming task may be any of the types of tasks discussed herein. The incoming task may be received by a first process running on the computing device. At operation 464, a plugin corresponding to the task or type of task received in operation 462 is loaded. The plugin may be loaded by a second process running the on the computing device, and the second process may be different than the first process.

At operation 466, the loaded plugin is executed to handle the incoming task. The loaded plugin may be executed in the second process. At operation 468, resource consumption metrics are monitored. The resource consumption metrics may be monitored by a resource manager associated with the first process that received the incoming task. The resource consumption metrics may be indicative of the resources consumed by the second process by the executing the loaded plugin. The monitored resource consumption metrics may include metrics such as memory usage needed to run (e.g., peak memory usage and average memory usage), total CPU cycles spent (e.g., real CPU time consumed), total duration spent in user-mode and kernel-mode, number of threads used by the process, and number of items or tasks the plugin was used to process during a particular run, among others. The monitored resource consumption metrics may also include responses to ACKs and associated data such as counts of timeouts, as discussed above.

At operation 470, computing state data is received or accessed. The computing state data may be received or accessed by the resource manager that monitors the resource consumption metrics of the process where the plugin is being executed. The computing state data indicates the state of the computing device, and may include any of the types of computing state data discussed herein. For example, the computing state data may include static data and dynamic data. The static data may include data relating to configurations of the computing device that are unlikely to change frequently, such as processor model, number of cores, overall CPU usage, total installed memory, overall memory usage, swap memory usage, storage device types (e.g., flash memory, hard disk drive, and interface type such as PCIe versus SATA versus MMC), and the like. The dynamic computing state data includes data relating to states that are more likely to change frequently, such as screen state (e.g., on or off), user activity, power source (e.g., battery or wired), number of applications and/or type of applications being executed, CPU utilization, memory utilization, power usage, etc.

At operation 472, the process executing the plugin (e.g., the second process) is controlled based on the resource consumption metrics and/or the computing state data. For instance, the computing resources allotted to the plugin process may be adjusted based on the resource consumption metrics and/or the computing state data. As an example, a CPU limit for the plugin process may be dynamically adjusted based on the resource consumption metrics and/or the computing state data. The plugin process may also suspend or terminate the plugin process. Such adjustments may be made according to a dynamic policy based on a trained machine learning model, as discussed above. As another example, if the resource consumption data indicates that the plugin has been marked as a misbehaving plugin (e.g., a misbehavior count exceeding a threshold), the plugin may be disabled and the plugin process terminated.

While various examples of examples of the present disclosure for monitoring and controlling or managing the execution of plugins have been described in the context of an indexer service having an infrastructure for running plugins to extract data from various types of documents, examples of the present disclosure are not limited thereto and may be applied in the context of other software applications and software services in which it would be useful to monitor and manage the execution of plugins and extensions to avoid or reduce the impact of misbehaving plugins and extensions on the overall performance of a computing device.

Figure 5:
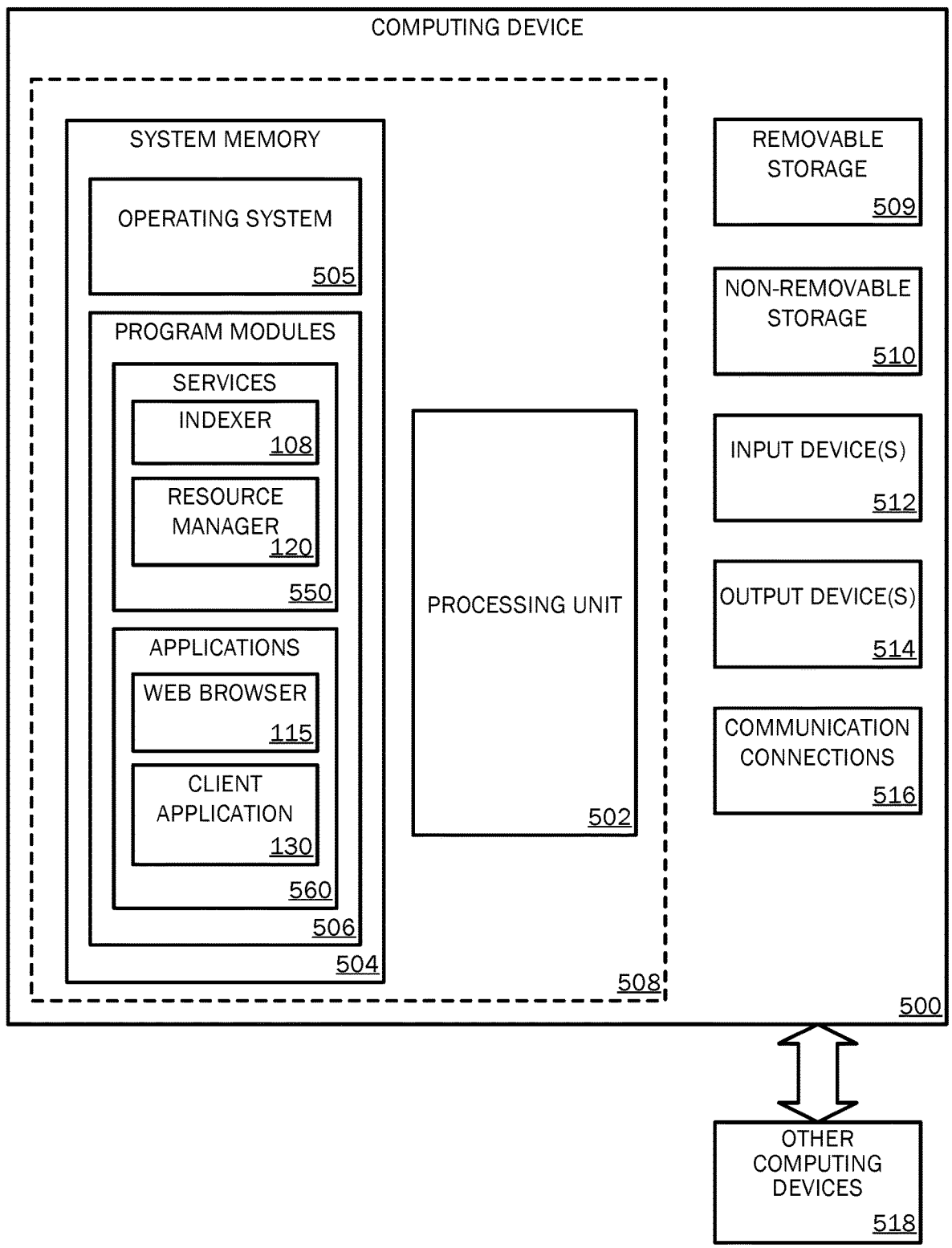
FIG. 5 is a block diagram illustrating example physical components of a computing device with which aspects of the invention may be practiced.
Figure 6A:
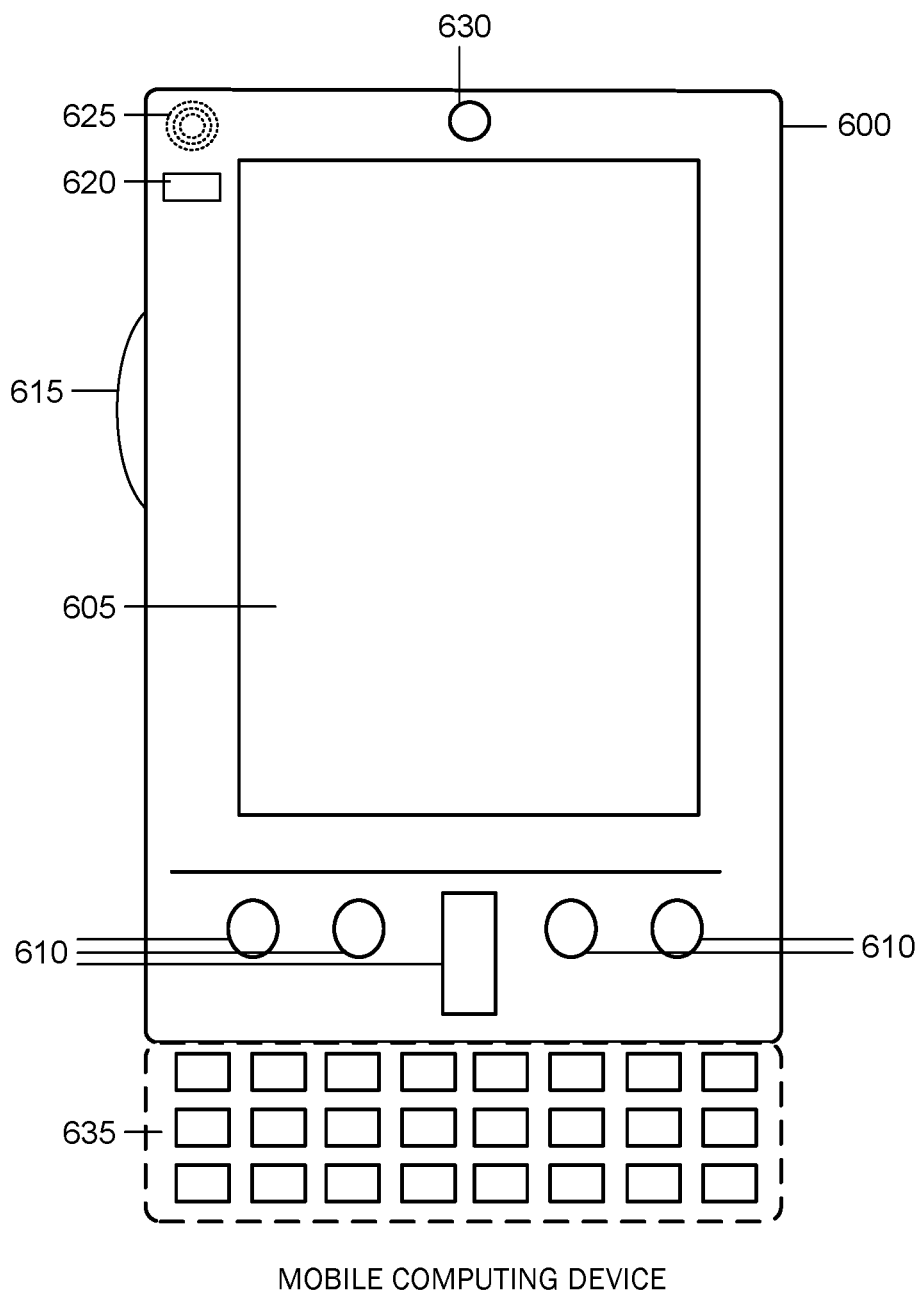
FIGS. 6A and 6B are simplified block diagrams of a mobile computing device with which aspects of the present invention may be practiced.
Figure 6B:
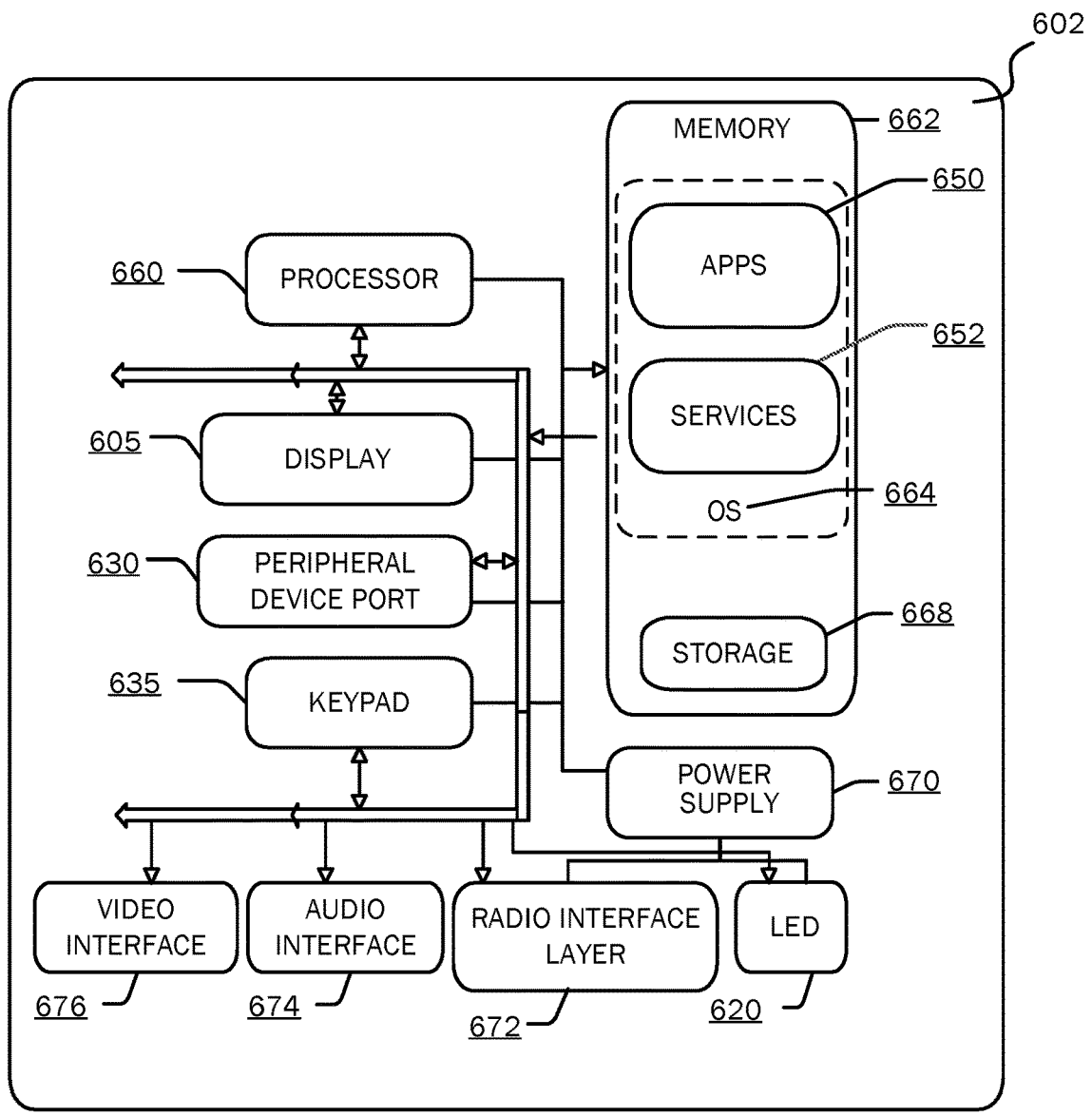
Figure 7:
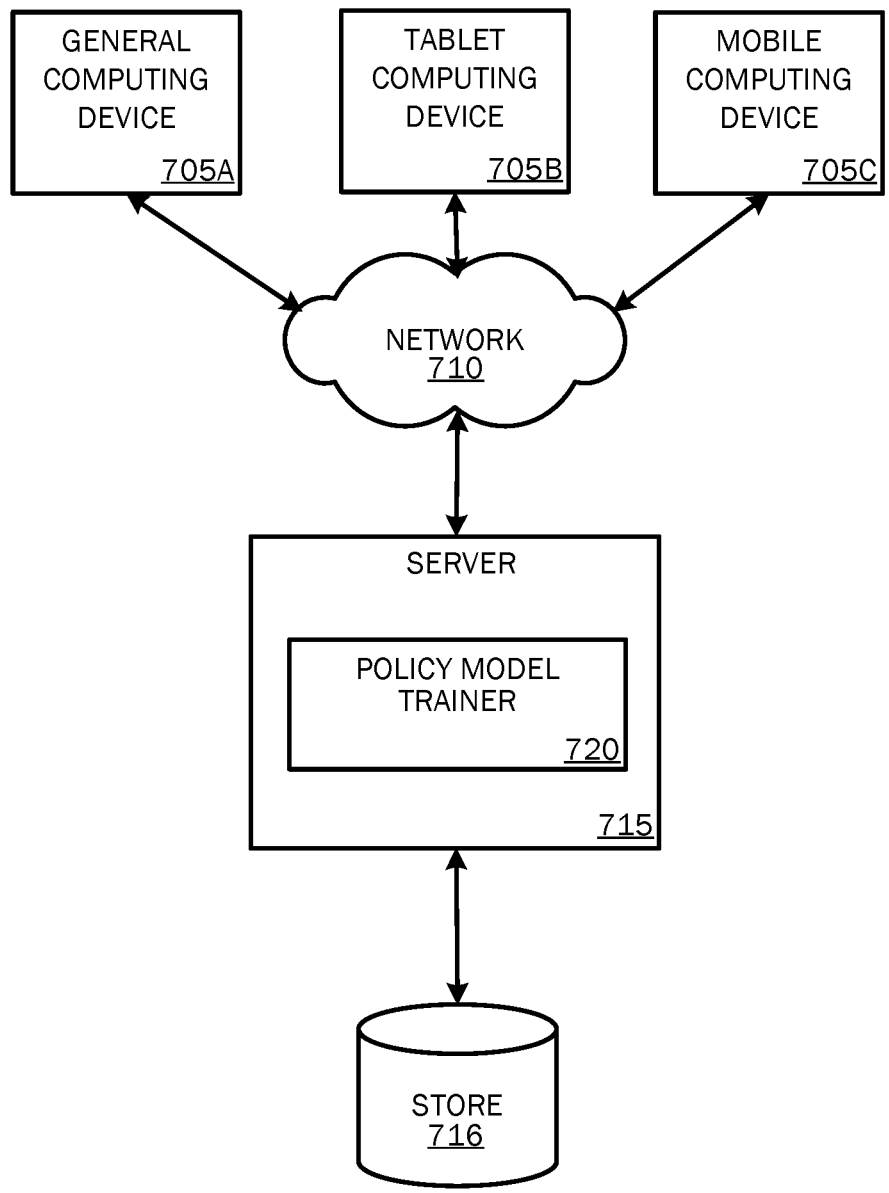
FIG. 7 is a simplified block diagram of a distributed computing system in which aspects of the present invention may be practiced.

FIGS. 5-7 and the associated descriptions provide a discussion of a variety of operating environments in which examples of the invention may be practiced. However, the devices and systems illustrated and discussed with respect to FIGS. 5-7 are for purposes of example and illustration and are not limiting of a vast number of computing device configurations that may be utilized for practicing aspects of the invention, described herein.

FIG. 5 is a block diagram illustrating physical components (i.e., hardware) of a computing device 500 with which examples of the present disclosure may be practiced. The computing device components described below may be suitable for the client device described above executing a host application or service, a plugin resource manager, and one or more plugins or extensions. In a basic configuration, the computing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combination of such memories. The system memory 504 may include an operating system 505 and one or more program modules 506 suitable for running plugin-hosting software services 550 or software applications 560 such as an indexer 108, web browser 115, plugin resource manager 120, or another application 130. The operating system 505, for example, may be suitable for controlling the operation of the computing device 500. Furthermore, aspects of the invention may be practiced in conjunction with other operating systems or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506 may perform processes including, but not limited to, one or more of the stages of the methods illustrated in FIGS. 2A-B and 4A-4C. Other program modules that may be used in accordance with examples of the present invention and may include applications such as electronic mail and contacts applications, word processing applications, spreadsheet applications, database applications, slide presentation applications, drawing or computer-aided application programs, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to monitoring the performance of plugins (e.g., resource consumption metrics) when handling tasks and scheduling tasks based on previously captured plugin performance (plugin telemetry), may be operated via application-specific logic integrated with other components of the computing device 500 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, aspects of the invention may be practiced within a general purpose computer or in any other circuits or systems.

The computing device 500 may also have one or more input device(s) 512 such as a keyboard, a mouse, a pen, a sound input device, a touch input device, etc. The output device(s) 514 such as a display, speakers, a printer, etc. may also be included. The aforementioned devices are examples and others may be used. The computing device 500 may include one or more communication connections 516 allowing communications with other computing devices 518. Examples of suitable communication connections 516 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (i.e., memory storage). Computer storage media may include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 6A and 6B illustrate a mobile computing device 600, for example, a mobile telephone, a smart phone, a tablet personal computer, a laptop computer, and the like, with which aspects of the invention may be practiced. With reference to FIG. 6A, an example of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative examples, mobile computing device 600 may incorporate more or less input elements. For example, the display 605 may not be a touch screen in some examples. In alternative examples, the mobile computing device 600 is a portable phone system, such as a cellular phone. The mobile computing device 600 may also include an optional keypad 635. Optional keypad 635 may be a physical keypad or a "soft" keypad generated on the touch screen display. In various aspects, the output elements include the display 605 for showing a graphical user interface (GUI), a visual indicator 620 (e.g., a light emitting diode (LED), and/or an audio transducer 625 (e.g., a speaker). In some examples, the mobile computing device 600 incorporates a vibration transducer for providing the user with tactile feedback. In yet another example, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one example of a mobile computing device. That is, the mobile computing device 600 can incorporate a system (i.e., an architecture) 602 to implement some examples. In one example, the system 602 is implemented as a "smart phone" capable of running one or more applications (e.g., browser, e-mail, calendaring, contact managers, messaging clients, games, and media clients/players). In some examples, the system 602 is integrated as a computing device, such as an integrated personal digital assistant (PDA) and wireless phone.

One or more application programs 650 and services 652 may be loaded into the memory 662 and run on or in association with the operating system 664. Examples of the application programs 650 include phone dialer programs, e-mail programs, personal information management (PIM) programs, word processing programs, spreadsheet programs, Internet browser programs, messaging programs, and so forth. Examples of the services 652 include document indexer services, software update services, and so forth. The system 602 also includes a non-volatile storage area 668 within the memory 662. The non-volatile storage area 668 may be used to store persistent information that should not be lost if the system 602 is powered down. The application programs 650 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600.

The system 602 has a power supply 670, which may be implemented as one or more batteries. The power supply 670 might further include an external power source, such as an AC adapter or a powered docking cradle that supplements or recharges the batteries.

The system 602 may also include a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 150 via the operating system 664, and vice versa.

The visual indicator 620 may be used to provide visual notifications and/or an audio interface 674 may be used for producing audible notifications via the audio transducer 625. In the illustrated example, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. The system 602 may further include a video interface 676 that enables an operation of an on-board camera 630 to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio 672 or via a distributed computing network. Similarly, such data/information may be readily transferred between computing devices for storage and use according to well-known data/information transfer and storage means, including electronic mail and collaborative data/information sharing systems.

FIG. 7 illustrates one example of the architecture of a system for training models for implementing execution policies in accordance with various examples described above. For example, telemetry collected from computing devices 705 (including general computing devices such as personal computers and servers 705A, a tablet computing devices 705B, and mobile computing devices 705C such as smart phones) in association with plugins (or other extensions to services and applications) may be stored in different communication channels or other storage types and in accordance with data formats (e.g., file types) associated with the data collection process. The server 715 stores the telemetry data associated with plugins in a data store 716 (e.g., a database), and a policy model trainer 720 trains a machine learning model or statistical model (e.g., as described above with respect to FIG. 4C) based on the received telemetry data. A server 715 may provide the trained model (or different models based on the type of computing device 705) to clients 118/705. As one example, the server 715 may be a web server providing access to the trained models over the Internet or through another network (e.g., a private intranet). By way of example, the client computing device 118 may be implemented and embodied in a personal computer or server 705A, a tablet computing device 705B and/or a mobile computing device 705C (e.g., a smart phone), or other computing device.

As will be understood from the foregoing disclosure, one aspect of the technology relates to computer storage media having instructions stored thereon which, when executed by a computing device including a processor and memory, cause the computing device to: receive, by a first process running on the computing device, an incoming task; load, by a second process running on the computing device, a plugin corresponding to a type of the incoming task; execute the plugin in the second process to handle the incoming task; monitor a plurality of resource consumption metrics of the plugin by a resource manager associated with the first process; and control the second process based on the resource consumption metrics of the plugin.

The instructions to monitor the plurality of resource consumption metrics may include instructions that, when executed by the computing device, cause the computing device to: send an event to the second process; set a timeout period for acknowledgement from the plugin; determine whether an acknowledgement was received from the plugin during the timeout period; and increment a misbehavior counter associated with the plugin when no acknowledgement was received within the timeout period. The instructions to monitor the plurality of resource consumption metrics may further include instructions that, when executed by the computing device, cause the computing device to: determine whether the misbehavior counter satisfies a threshold value; and mark the plugin as a misbehaving plugin when the misbehavior counter has satisfied the threshold value.

The instructions may further include instructions that, when executed by the computing device, cause the computing device to disable the misbehaving plugin based on being marked as a misbehaving plugin. The instructions to monitor the plurality of resource consumption metrics may include instructions that, when executed by the computing device, cause the computing device to: monitor resource consumption metrics associated with the second process during execution of the plugin by the second process; and store the resource consumption metrics in association with the plugin.

The instructions may further include instructions that, when executed by the computing device, cause the computing device to: evaluate a plugin execution policy associated with the plugin based on a current state of the computing device; set a task priority on the incoming task based on the plugin execution policy; and update a queue including a plurality of tasks and the incoming task based on the task priority. The plugin execution policy may include a trained model, the trained model being trained on training data including collected resource consumption metrics associated with the plugin. The collected resource consumption metrics associated with the plugin may include resource consumption metrics collected from a plurality of different computing devices executing the plugin. The second process may have exactly one plugin loaded. The instructions may further include instructions that, when executed by the computing device, cause the computing device to: determine a type of a second plugin; and load the second plugin in the second process or a third process, wherein the second plugin may be loaded in the second process in response to determining that the second plugin has a first type, and wherein the second plugin may be loaded in a third process in response to determining that the second plugin has a second type.

Another aspect of the technology relates to a computer-implemented method for controlling operation of one or more plugins, the method including: determining a plugin for an incoming task; evaluating a plugin execution policy by supplying a feature vector to a machine learning model trained on historical telemetry data associated with the plugin, wherein the feature vector includes an identity of the determined plugin and computing state data; based on the evaluation of the plugin execution policy, setting a priority for the incoming task; and updating a task queue based on the set priority for the incoming task.

The computing state data may include at least one of a screen state, a power state, or a CPU-usage level. The computer-implemented method may further include controlling a process for executing the determined plugin based on the evaluation of the plugin execution policy. The computer-implemented method may further include: subsequent to updating the task queue, re-evaluating the plugin execution policy by supplying an updated feature vector to the machine learning model; based on the re-evaluation of the plugin execution policy, setting an updated priority for the incoming task; and based on the updated priority, updating the task queue. The computer-implemented method may further include: loading training data regarding the execution of a particular plugin, the training data including historical telemetry data collected from a plurality of computing devices regarding the execution of a particular plugin; and training the machine learning model with the loaded training data. The computer-implemented method may further include: monitoring resource consumption metrics associated with a process executing the plugin; and controlling the process based on the monitored resource consumption metrics and the computing state data.

Another aspect of the technology relates to a system including: a processor; and memory storing instructions that, when executed by the processor, cause the system to perform a set of operations including: determining a plugin for an incoming task; supplying a feature vector to a machine learning model trained on historical telemetry data associated with the plugin, wherein the feature vector includes an identity of the determined plugin and computing state data; based on output from the machine learning model, setting a priority for the incoming task; and updating a task queue based on the set priority for the incoming task.

The operations may further include: loading training data regarding the execution of a particular plugin, the training data including historical telemetry data collected from a plurality of computing devices regarding the execution of a particular plugin; and training the machine learning model with the loaded training data. The plug in may be a third-party plugin. The system may further include controlling a process for executing the determined plugin based on the output from the machine learning model.

Aspects of the present invention, for example, are described above with reference to block diagrams and/or operational illustrations of methods, systems, and computer program products according to aspects of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved. Further, as used herein and in the claims, the phrase "at least one of element A, element B, or element C" is intended to convey any of: element A, element B, element C, elements A and B, elements A and C, elements B and C, and elements A, B, and C.

The description and illustration of one or more examples provided in this application are not intended to limit or restrict the scope of the invention as claimed in any way. The aspects, examples, and details provided in this application are considered sufficient to convey possession and enable others to make and use the best mode of claimed invention. The claimed invention should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope of the claimed invention.

We claim:

1. Computer storage media having instructions stored thereon which, when executed by a computing device comprising a processor and memory, cause the computing device to:
   receive, by a first process running on the computing device, an incoming task;
   load, by a second process running on the computing device, a plugin corresponding to a type of the incoming task;
   execute the plugin in the second process to handle the incoming task;
   monitor a plurality of resource consumption metrics of the plugin by a resource manager associated with the first process;
   control the second process based on the resource consumption metrics of the plugin;
   send an event to the second process;
   set a timeout period for acknowledgement from the plugin;
   determine whether an acknowledgement was received from the plugin during the timeout period; and
   increment a misbehavior counter associated with the plugin when no acknowledgement was received within the timeout period.

2. The computer storage media of claim 1, wherein the instructions to monitor the plurality of resource consumption metrics further comprise instructions that, when executed by the computing device, cause the computing device to:
   determine whether the misbehavior counter satisfies a threshold value; and
   mark the plugin as a misbehaving plugin when the misbehavior counter has satisfied the threshold value.

3. The computer storage media of claim 2, wherein the instructions further comprise instructions that, when executed by the computing device, cause the computing device to disable the misbehaving plugin based on being marked as a misbehaving plugin.

4. The computer storage media of claim 1, wherein the instructions to monitor the plurality of resource consumption metrics comprise instructions that, when executed by the computing device, cause the computing device to:
   monitor resource consumption metrics associated with the second process during execution of the plugin by the second process; and
   store the resource consumption metrics in association with the plugin.

5. The computer storage media of claim 1, wherein the instructions further comprise instructions that, when executed by the computing device, cause the computing device to:
   evaluate a plugin execution policy associated with the plugin based on a current state of the computing device;
   set a task priority on the incoming task based on the plugin execution policy; and
   update a queue comprising a plurality of tasks and the incoming task based on the task priority.

6. The computer storage media of claim 5, wherein the plugin execution policy comprises a trained model, the trained model being trained on training data comprising collected resource consumption metrics associated with the plugin.

7. The computer storage media of claim 6, wherein the collected resource consumption metrics associated with the plugin comprise resource consumption metrics collected from a plurality of different computing devices executing the plugin.

8. The computer storage media of claim 1, wherein the second process has exactly one plugin loaded.

9. The computer storage media of claim 1, wherein the instructions further comprise instructions that, when executed by the computing device, cause the computing device to:
   determine a type of a second plugin; and
   load the second plugin in the second process or a third process,
   wherein the second plugin is loaded in the second process in response to determining that the second plugin has a first type, and
   wherein the second plugin is loaded in a third process in response to determining that the second plugin has a second type.

10. A computer-implemented method comprising:
   receiving, by a first process running on the computing device, an incoming task;
   loading, by a second process running on the computing device, a plugin corresponding to a type of the incoming task;
   executing the plugin in the second process to handle the incoming task;
   monitoring a plurality of resource consumption metrics of the plugin by a resource manager associated with the first process;
   controlling the second process based on the resource consumption metrics of the plugin;
   evaluating a plugin execution policy associated with the plugin based on a current state of the computing device;
   setting a task priority on the incoming task based on the plugin execution policy; and updating a queue comprising a plurality of tasks and the incoming task based on the task priority.

11. The method of claim 10, further comprising:
sending an event to the second process;
setting a timeout period for acknowledgement from the plugin;
determining whether an acknowledgement was received from the plugin during the timeout period; and
incrementing a misbehavior counter associated with the plugin when no acknowledgement was received within the timeout period.

12. The method of claim 11, further comprising:
determining whether the misbehavior counter satisfies a threshold value; and
marking the plugin as a misbehaving plugin when the misbehavior counter has satisfied the threshold value.

13. The method of claim 12, further comprising disabling the misbehaving plugin based on being marked as a misbehaving plugin.

14. The method of claim 10, further comprising:
monitoring resource consumption metrics associated with the second process during execution of the plugin by the second process; and
storing the resource consumption metrics in association with the plugin.

15. The method of claim 10, wherein the plugin execution policy comprises a trained model, the trained model being trained on training data comprising collected resource consumption metrics associated with the plugin.

16. The method of claim 15, wherein the collected resource consumption metrics associated with the plugin comprise resource consumption metrics collected from a plurality of different computing devices executing the plugin.

17. The method of 10, wherein the second process has exactly one plugin loaded.

18. The method of claim 10, further comprising:
determining a type of a second plugin; and
loading the second plugin in the second process or a third process,
wherein the second plugin is loaded in the second process in response to determining that the second plugin has a first type, and
wherein the second plugin is loaded in a third process in response to determining that the second plugin has a second type.

19. A system comprising:
a processor; and
memory storing instructions that, when executed by the processor, causes the system to perform operations comprising:
receiving, by a first process running on the computing device, an incoming task;
loading, by a second process running on the computing device, a plugin corresponding to a type of the incoming task;
executing the plugin in the second process to handle the incoming task;
monitoring a plurality of resource consumption metrics of the plugin by a resource manager associated with the first process;
controlling the second process based on the resource consumption metrics of the plugin;
evaluating a plugin execution policy associated with the plugin based on a current state of the computing device;
setting a task priority on the incoming task based on the plugin execution policy; and
updating a queue comprising a plurality of tasks and the incoming task based on the task priority.

20. The system of claim 19, wherein:
the plugin execution policy comprises a trained model, the trained model being trained on training data comprising collected resource consumption metrics associated with the plugin; and
the collected resource consumption metrics associated with the plugin comprise resource consumption metrics collected from a plurality of different computing devices executing the plugin.

* * * * *